US011057865B1

(12) United States Patent
Wong et al.

(10) Patent No.: US 11,057,865 B1
(45) Date of Patent: Jul. 6, 2021

(54) APPARATUS AND METHODS FOR ENHANCED PAGING IN WIRELESS NETWORKS

(71) Applicant: Charter Communications Operating, LLC, St. Louis, MO (US)

(72) Inventors: Curt Wong, Bellevue, WA (US); Yildirim Sahin, Englewood, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 16/879,345

(22) Filed: May 20, 2020

(51) Int. Cl.
*H04W 68/02* (2009.01)
*H04W 68/00* (2009.01)

(52) U.S. Cl.
CPC ................. *H04W 68/005* (2013.01)

(58) Field of Classification Search
CPC ... H04W 68/00; H04W 68/005; H04W 68/02; H04W 68/10
See application file for complete search history.

(56) References Cited

U.S. PATENT DOCUMENTS

| | | | |
|---|---|---|---|
| 2018/0288657 A1 | 10/2018 | Stojanovski et al. | |
| 2020/0053622 A1* | 2/2020 | Huang-Fu | H04L 45/306 |
| 2020/0260330 A1* | 8/2020 | Zhu | H04W 40/24 |

OTHER PUBLICATIONS

Wong (WO/2020/103654 A1) discloses route selection policy acquisition method and apparatus, filed on Oct. 30, 2019 and published on May 28, 2020 (Year: 2020).*
Wang (WO/2020/037666 A1) discloses configuring route selection policies, filed on Aug. 24, 2018 and published on Feb. 27, 2020 (Year: 2020).*
3GPP TR 23.761 V1.1.1 (Oct. 2020); 3rd Generation Partnership Project; Technical Specification Group Services and System Aspects; Study on system enablers for devices having multiple Universal Subscriber Identity Modules (USIM) (Release 17);.
3GPP TS 23.501 v.15.4.0 (Dec. 2018) 3rd Generation Partnership Project; Technical Specification Group Services and System Aspects; System Architecture for the 5G System; Stage 2; Release 15, 236 pages.
3GPP TS 23.502 3rd Generation Partnership Project; Technical Specification Group Services and System Aspects; Procedures for the 5G System; Stage 2; v. 16.0.0, (Mar. 2019) 420 pages.
3GPP TS 23.503 V16.0.0 (Mar. 2019); 3rd Generation Partnership Project; Technical Specification Group Services and System Aspects; Policy and Charging Control Framework for the 5G System; Stage 2 (Release 16);.

(Continued)

*Primary Examiner* — Siu M Lee
(74) *Attorney, Agent, or Firm* — Gazdzinski & Associates, PC

(57) ABSTRACT

Apparatus and methods for managed or "intelligent" paging of a user device in one or more wireless networks. In one embodiment, the apparatus and methods provide enhanced wireless services which enable prioritized paging operations of a given user device (e.g., a mobile 3 GPP-compliant UE) within two or more mobile networks (e.g., PLMNs) when the UE is operating in a "dual" mode such as 3 GPP 5G NR dual-SIM, dual standby (DSDS) mode. In one implementation, the UE contains multiple SIM cards to enable connection to different PLMNs simultaneously, such that paging associated with one network can be managed and prioritized as needed when the UE is actively utilizing another network.

20 Claims, 23 Drawing Sheets

(56) References Cited

OTHER PUBLICATIONS

3GPP TS 38.460 V16.0.0 (Dec. 2019); 3rd Generation Partnership Project; Technical Specification Group Radio Access Network; NG-RAN; E1 general aspects and principles (Release 16);.
3GPP., "Study on New Radio Access Technology, Radio Interface Protocol Aspects (Release 14)", Technical Specification Group Radio Access Network, Technical Report (TR 38.804), V14.0.0 (Mar. 2017), 57 pages.
Article 5 of the Radio Regulations (edition 2001), Introduction to International Radio Regulations, 161 pages.
Deering, S., et al., "Internet Protocol, Version 6 (IPv6) Specification", Internet Engineering Task Force (IETF), Dec. 1998, 39 pages.
IEEE Std. 802.11, 1997.
"Internet Protocol, DARPA Internet Program, Protocol Specification", IETF RCF 791, Sep. 1981, 50 pages.
Nokia 5G New Radio (NR): Physical Layer Overview and Performance, IEEE Communication Theory Workshop, 2018 by A. Ghosh, May 15, 2018, 38 pages.

\* cited by examiner

FIG. 4B

| | Example URSPe rules |
|---|---|
| Rule Precedence =1 | Route Selection Descriptor Precedence =1<br>DNN Selection: DNN1 |
| Traffic Descriptor: Application Identifiers=App1 | This URSPe rule associates the traffic of application "App1" with "DNN1" DNN.<br>It enforces the following routing policy:<br>The traffic of App1 should be transferred on a PDU session supporting DNN=DNN1.<br>** DNN1 is used for applications that are categorized as Urgent.<br>**Application Identifiers=App1 (e.g., xSkype) |
| Rule Precedence =2 | Route Selection Descriptor Precedence =1<br>DNN Selection: DNN2 |
| Traffic Descriptor: Application Identifiers=App2 | This URSPe rule associates the traffic of application "App2" with "DNN2" DNN.<br>It enforces the following routing policy:<br>The traffic of App2 should be transferred on a PDU session supporting DNN=DNN2.<br>** DNN2 is used for applications that are categorized as Default<br>**Application Identifiers=App2 (e.g., xWhatsApp) |
| Rule Precedence =3 | Route Selection Descriptor Precedence =1<br>DNN Selection: DNN3 |
| Traffic Descriptor: Application Identifiers=App3 | This URSPe rule associates the traffic of application "App3" with "DNN3" DNN.<br>It enforces the following routing policy:<br>The traffic of App3 should be transferred on a PDU session supporting DNN=DNN3.<br>** DNN3 is used for applications that are categorized as Ignore<br>**Application Identifiers=App3 (e.g., Xyahoo mail) |
| Rule Precedence =4 | Route Selection Descriptor Precedence =1<br>DNN Selection: DNN1 |
| Traffic Descriptor: IP descriptors=IP-x, port-y, protocolID-z | This URSPe rule associates the traffic of matching destination IP3 tuples of {IP-x, port-y, protocolID-z} with "DNN1" DNN.<br>It enforces the following routing policy:<br>The destination IP tuple of IP address = "IP-x", Destination Port Number = "port-y" and Protocol ID = protocolID-z should be transferred on a PDU session supporting DNN=DNN1.<br>** DNN1 is used for applications that are categorized as Urgent<br>**Application Identifiers based on traffic descriptor e.g., application server's IP/port address information. |
| <additional Traffic descriptors> | <additional Route Descriptors><br>** Other traffic descriptor(s) can be used to map to different DNN. |

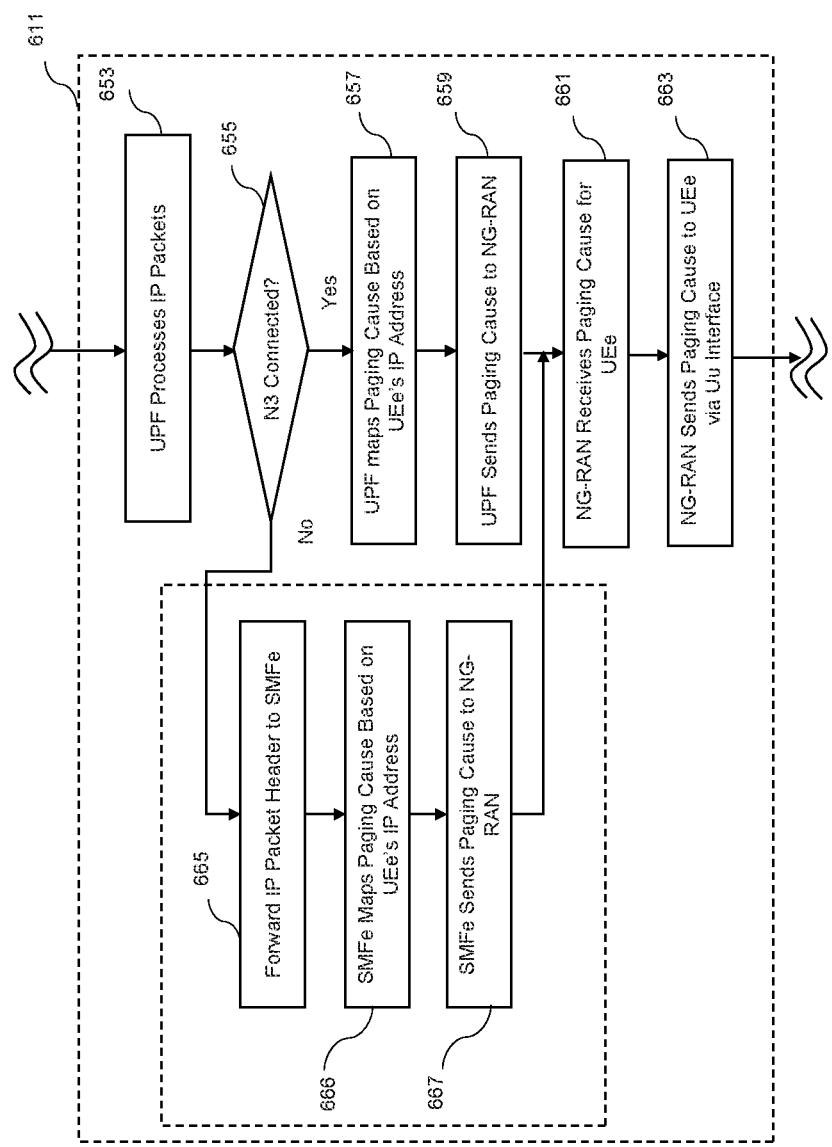

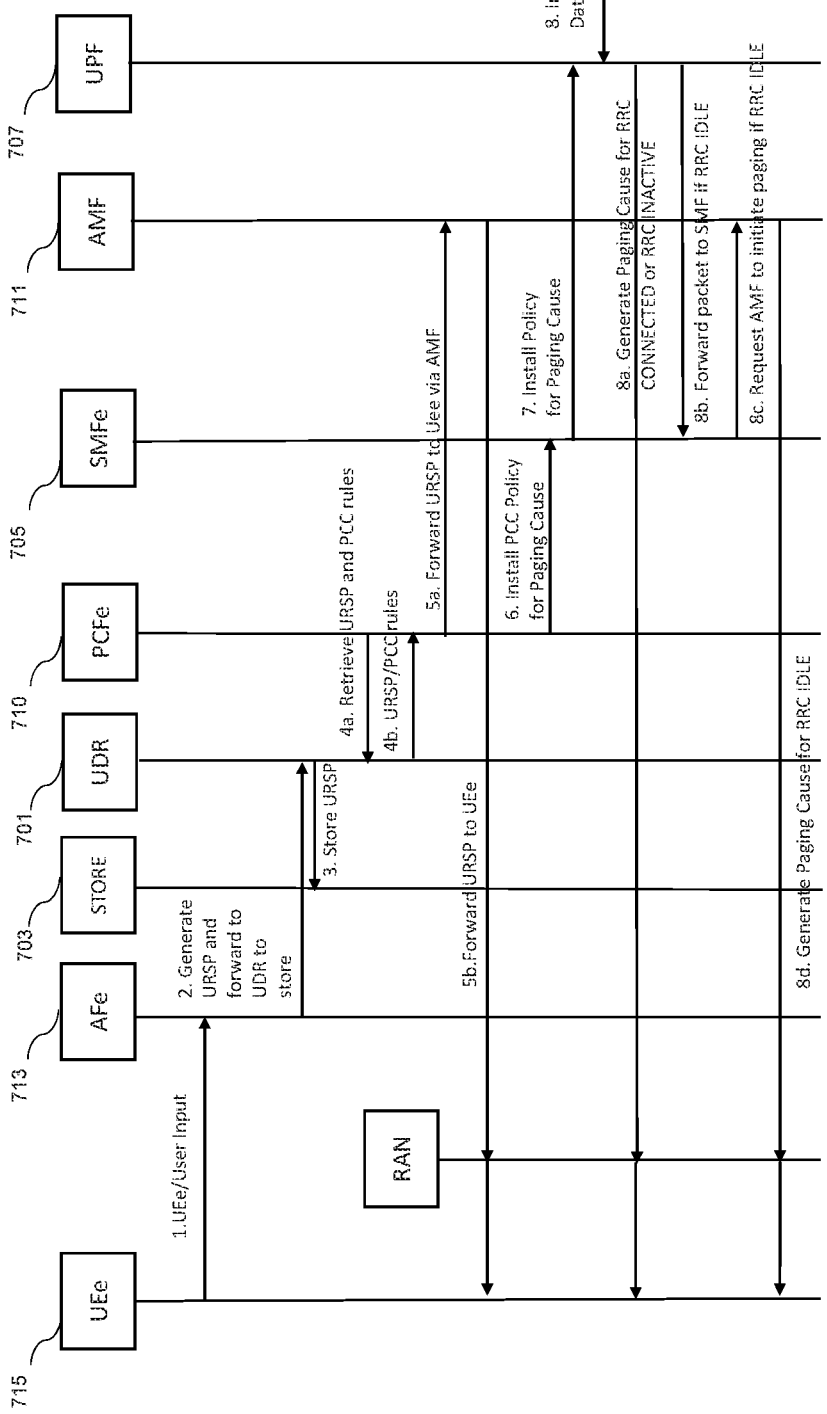

APPARATUS AND METHODS FOR ENHANCED PAGING IN WIRELESS NETWORKS

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of wireless devices and networks thereof, and specifically in one exemplary aspect to "intelligent" and adaptive paging notification to user devices such as wireless-enabled smartphones or other communication devices.

2. Description of Related Technology

A multitude of wireless networking technologies, also known as Radio Access Technologies ("RATs"), provide the underlying means of connection for radio-based communication networks to user devices. Such RATs often utilize licensed radio frequency spectrum (i.e., that allocated by the FCC per the Table of Frequency Allocations as codified at Section 2.106 of the Commission's Rules). Currently only frequency bands between 9 kHz and 275 GHz have been allocated (i.e., designated for use by one or more terrestrial or space radio communication services or the radio astronomy service under specified conditions). For example, a typical cellular service provider might utilize spectrum for so-called "3G" (third generation) and "4G" (fourth generation) wireless communications as shown in Table 1 below:

TABLE 1

| Technology | Bands |
| --- | --- |
| 3G | 850 MHz Cellular, Band 5 (GSM/GPRS/EDGE). |
| | 1900 MHz PCS, Band 2 (GSM/GPRS/EDGE). |
| | 850 MHz Cellular, Band 5 (UMTS/HSPA+ up to 21 Mbit/s). |
| | 1900 MHz PCS, Band 2 (UMTS/HSPA+ up to 21 Mbit/s). |
| 4G | 700 MHz Lower B/C, Band 12/17 (LTE). |
| | 850 MHz Cellular, Band 5 (LTE). |
| | 1700/2100 MHz AWS, Band 4 (LTE). |
| | 1900 MHz PCS, Band 2 (LTE). |
| | 2300 MHz WCS, Band 30 (LTE). |

User client devices (e.g., smartphone, tablet, phablet, laptop, smartwatch, or other wireless-enabled devices, mobile or otherwise) generally support multiple RATs that enable the devices to connect to one another, or to networks (e.g., the Internet, intranets, or extranets), often including RATs associated with both licensed and unlicensed spectrum. In particular, wireless access to other networks by client devices is made possible by wireless technologies that utilize networked hardware, such as a wireless access point ("WAP" or "AP"), small cells, femtocells, or cellular towers, serviced by a backend or backhaul portion of service provider network (e.g., a cable network). A user may generally access the network at a node or "hotspot," a physical location at which the user may obtain access by connecting to modems, routers, APs, small cells, etc. that are within wireless range.

5G New Radio (NR) and NG-RAN (Next Generation Radio Area Network)

NG-RAN or "NextGen RAN (Radio Area Network)" is part of the 3GPP "5G" next generation radio system. 3GPP has specified Release 16 NG-RAN (and is currently working on Release 17), its components, and interactions among the involved nodes including so-called "gNBs" (next generation Node B's or eNBs). NG-RAN will provide high-bandwidth, low-latency wireless communication and efficiently utilize, depending on application, both licensed and unlicensed spectrum of the type described supra in a wide variety of deployment scenarios, including indoor "spot" use, urban "macro" (large cell) coverage, rural coverage, use in vehicles, and "smart" grids and structures. NG-RAN will also integrate with 4G/4.5G systems and infrastructure, and moreover new LTE entities are used (e.g., an "evolved" LTE eNB or "eLTE eNB" which supports connectivity to both the EPC (Evolved Packet Core) and the NR "NGC" (Next Generation Core, also called "5GC").

As background, FIG. 1 shows the 5G architecture 100 and components thereof as defined in 3GPP TS 23.501 (FIG. 4.2.3-1 thereof).

FIG. 2A shows the 5G system architecture in the non-roaming case, illustrating how various network functions interact with each other.

FIG. 2B shows the 3GPP 5G architecture 230 for a UE connecting with and concurrently accessing two networks (e.g., local and central) using multiple PDU sessions. As shown, two Session Management Functions (SMF) are selected for supporting two different Packet Data Unit (PDU) sessions via two separate UPFs (User Plane Functions). The 3GPP 5G architecture also supports concurrent access by a UE to two networks (e.g., local and central) within a single PDU session.

As further background, 3GPP has also defined roaming architectures between two networks Home Public Land Mobile Network (HPLMN), and Visited Public Land Mobile Network (VPLMN) when the two PLMN have overlap in coverage area. FIG. 2C shows the architecture 250 for roaming between HPLMN 253 and VPLMN 255 as defined in 3GPP TS 23.501 (FIG. 4.2.4-3 thereof), specifically the roaming architecture in the case of home routed scenario with serviced-bases interface within the Control Plane. In this architecture, the UE is connected to the Data Network (DN) 307 from the HPLMN, and all traffic is routed from the HPLMN via a DN gateway (not shown).

FIG. 2D shows an architecture 270 similarly for roaming between HPLMN and VPLMN as defined in TS 23.501 (FIG. 4.2.4-1 thereof), specifically, the roaming architecture in the case of local breakout with service-based interface within Control Plane. In this architecture, UE is connected to the DN 279 from the VPLMN, and the traffic is transported between the UE and the DN 279 without traversing a DN gateway (not shown) in the home network. Additionally, in this architecture, the PCF 277 in VPLMN may interact with an Application Function (AF) 273 in order to generate Policy and Charging Control (PCC) rules.

In the extant 5G or 3GPP cellular wireless systems, when a UE connects with another wireless Mobile Operating Network (MNO), the visited network identifies the UE home network. If there is a roaming agreement between the home network and the visited network, the UE is able to connect with the visited network.

As described in TS 23.503 (section 6.1.2.2.1), UE Route Selection Policy (URSP) information contains a list of prioritized Session Management (SM) policy rules, where each rule may have one or more Traffic Descriptor (TD) components associated with one or more route selection components. The UE uses these rules to determine if one or more TDs can be associated to an established PDU session, can be offloaded to non 3GPP access outside of a 3GPP session, or can trigger the establishment of a new PDU session.

Paging in UE (e.g., Multi-SIM) Devices and Unaddressed Issues—

Multi-SIM devices (i.e., user devices with two or more subscriber identity modules or SIMs, embodied as e.g., 3GPP UEs) are currently deployed commercially, and provide a solution for situations when the UE roams from its home network (e.g., an HPLMN), and intends to connect to a visited network (e.g., VPLMN) that does not have roaming agreement with its home network. Each USIM provides a phone number and an identity for the device in order the enable functions such receiving or making calls/texts/data on each number, including paging notifications for e.g., incoming data.

Extant 3GPP specifications do not specify particular implementation of multi-USIM UEs. Hence, each network operator and UE manufacturer may implement the Multi-USIM architecture and protocol differently, resulting in a variety of implementations and architectures.

As noted above, multi-USIM UEs are capable of connecting to multiple networks independently. One sub-species thereof, the Dual-USIM, also referred to Dual-SIM Dual-Standby (DSDS) UEs are the most common commercially deployed multi-USIM devices. The Dual-USIM UEs are able to connect to a first network using a first USIM (USIM-A), and to a second network using a second USIM (USIM-B) independent of the connection maintained by USIM-A. To reduce the manufacturing cost of such UEs, the radio and baseband components are often shared between the two USIMs. However, in such cases, coordination logic is needed to manage the operation of two different USIMs, and to use the appropriate USIM with the associated network with which it is registered. For instance, while the UE is connected to the first network associated with USIM-A, in the cycle between data transmissions for that network, the UE needs to measure the received signal from the second network associated with USIM-B, monitor the paging channel, or read system information (e.g., SI blocks or SIBs) to, inter alia, maintain status of and determine the possibility of connecting to the second network. The MUSIM UE in such cases cannot "connect" to both networks simultaneously per se, but rather connects to one and maintains the other in a "standby" or idle state for possible connection.

A multi-USIM UE (e.g., DSDS UE) assumes an operating environment wherein the two networks associated with USIM-A and -B have an overlap in the coverage area; hence, a data application within the UE can be allocated to the appropriate network anytime when the UE is located in the coverage area of that network. However, while the multi-USIM UE is actively communicating with one network (e.g., a PLMN associated to USIM-A), the multi-USIM UE may receive network paging from the other networks (e.g., a PLMN associated to USIM-B). In the absence of any procedure for handing the paging requests from the other networks, the multi-USIM UE device may ignore the request, or autonomously leave the connection with the current network in favor of the other network. This situation can present salient issues, however (e.g., unwanted interruption, or failure to provide any notifications), and requires special handling within the multi-USIM UE in order to provide good user experience.

In currently proposed solutions, the Type of Service (ToS) Flow, which is data included in the IPv4 packet header, specifies the data packet priorities for such IP packets. IPv6 IP packets have a Traffic Class (TC) which can be used for similar purposes. Currently, both of these fields (ToS and TC) are used for "Differentiated services" or "differentiated services code point (DSCP)" as stated by RFC 2474. Based on the ToS/TC value, a packet can be placed in a prioritized queue or dismissed. As described in 3GPP TR 23.761, the ToS/TC value from the IP header of the received IP packet, which identifies the corresponding Quality of Service (QoS), is mapped to a paging cause (PC) to be signaled to the UE.

The foregoing mechanism(s) raise particular issues with, inter alia, paging the UE. In particular, when a UE receives an IP packet from different applications (e.g., Skype, WhatsApp, etc.), the multi-USIM UE is not able to set the paging causes between different applications. Moreover, some applications may have higher priorities than the then-current (e.g., in-focus) application which is transacting data, and the multi-USIM UE requires that a paging cause be used to established that relationship immediately. In such scenarios, the existing procedure that maps e.g., ToS value to a paging cause, is not able to prioritize the various paging causes. Hence, the multi-USIM UE may ignore an urgent paging request, which can create unpleasant and undesirable user experience, such as where the user does not receive an urgent notification from a family member.

Accordingly, improved methods and apparatus are needed to enable, inter alia, prioritizing paging requests originated from different networks for a UE that can connect to the respective different networks (and potentially different network operators), such as where one network is associated with a first PLMN, and the second network is associated with another PLMN. Specifically, such improved methods and apparatus would also ideally allow a UE (such as e.g., multi-USIM UE) to prioritize the paging requests based on the applications selections by the user and operators. Such improved methods and apparatus would also allow the UE distinguish between important downlink data and associated notifications versus other unimportant data notifications, and further allow the prioritization scheme to "travel" with the user (e.g., be operative not only within the user's home network, but also within a visited network (such as e.g., when the user travels away from home on business).

SUMMARY

The present disclosure addresses the foregoing needs by providing, inter alia, methods and apparatus for providing enhanced multi-network connection and operation (including service/application paging notification support) for wireless mobile devices.

In a first aspect of the disclosure, computerized network apparatus for use within a wireless network infrastructure is described. In one embodiment, the apparatus includes: digital processing apparatus; at least one data network interface in data communication with the digital processing apparatus; and a storage device in data communication with the digital processing apparatus, the storage device comprising a storage medium having at least one computer program.

In one variant, the at least one computer program is configured to, when executed on the digital processing apparatus, cause the computerized network apparatus to: receive first data relating to one or more processing rules for respective one or more software applications operative to execute on a user device; based at least on the received first data, determine at least one route selection policy associated with data traffic of the one or more software applications; and cause forwarding of second data relating to the at least one route selection policy to the user device. In one implementation, the forwarding of the second data relating to the at least one route selection policy enables the user device to selectively implement the one or more processing rules for paging notifications sent to the user device when the user device is connected to the wireless network infrastructure.

In another variant, the second data includes data indicative of one or more paging causes.

In a further variant, the at least one computer program is further configured to, when executed, enable selective routing of Internet Protocol (IP) packets to the user device, the IP packets associated with one of the software applications, the IP packets comprising a destination address associated with the particular one of the software applications.

In another variant, the wireless network infrastructure is compliant with 3GPP 5G NR (Fifth Generation New Radio) protocols, and the second data includes a URSP (UE Route Selection Policy). In one such implementation, the URSP (UE Route Selection Policy) includes at least one Data Network Name (DNN) value.

In a further variant, the computerized network apparatus includes at least: (i) a 5G NR Session Management Function (SMF), and (ii) a 5G NR User Plane Function (UPF). In one implementation, the computerized network apparatus further includes a Policy Control Function (PCF).

In another aspect, a method of performing paging notification management within a wireless network is disclosed. In one embodiment, the method includes: receiving data indicative of user preferences for notifications relating to each of a plurality of applications operative to execute on a wireless computerized client device of the user; causing generation of one or more rules based on the received data; receiving a plurality of IP data packets at the wireless network, the plurality of IP data packets generated by respective ones of data sources associated with each of the plurality of applications; processing the received plurality of IP data packets to map the IP data packets to a plurality of paging causes; and causing transmission of at least one paging notification for each of the plurality of applications to the wireless computerized client device, each of the at least one paging notifications comprising one of the plurality of paging causes. In one variant, the method enables the wireless computerized client device to selectively disposition each of the at least one paging notifications according to the user preferences.

In another variant, the method further includes assigning a plurality of unique IP addresses to each of the plurality of applications, each of the plurality of IP data packets comprising an applicable one of the plurality of unique IP addresses. In one such implementation, the receiving data indicative of user preferences for notifications relating to each of a plurality of applications operative to execute on a wireless computerized client device of the user includes receiving data indicative of at least two groups, each of the groups comprising at least one of the plurality of applications; and the method further includes correlating each of the unique IP addresses to at least one of the plurality of paging causes.

In another aspect of the disclosure, a computerized mobile device configured for use within multiple mobile network environments is described. In one embodiment, the device includes: digital processor apparatus; wireless interface apparatus in data communication with the digital processor apparatus and configured for wireless communication with at least a first radio area network (RAN) utilizing a first wireless access technology; and storage apparatus in data communication with the digital processor apparatus and comprising a storage medium, the storage medium comprising at least one computer program.

In one variant, the at least one computer program is configured to, when executed on the digital processor apparatus: receive policy data relating to data traffic management of a plurality of user applications operative to execute on the computerized mobile device; receive a plurality of paging notifications from a first of the multiple mobile network environments, the paging notifications each comprising a paging cause which is differentiated relative to others of the plurality of paging notifications; and based at least on the received policy data and the paging causes, selectively disposition each of the paging notifications.

In another variant, the selective disposition of at least one of the paging notifications includes: terminating a connection with the first network environment; establishing a connection with a second of the network environments; and requesting a PDU session be established via the second network environment for receiving IP data traffic associated with one of the plurality of user applications.

In another variant, the computerized mobile device further includes: first subscriber identity apparatus configured to enable connection of the computerized mobile device to the first network environment; and second subscriber identity apparatus configured to enable connection of the computerized mobile device to the second network environment. In one implementation, the computerized mobile device includes a DSDS (dual-SIM, dual standby) device which is only capable of one network connection at a given time.

In another aspect, an enhanced client device is disclosed. In one embodiment, the client device is a mobile device (e.g., smartphone or tablet) with DSDS and dual-SIM capability. In another embodiment, the client device is configured as a CPE (consumer premises equipment) such as a fixed wireless access (FWA) device mounted on a pole or rooftop or building façade, and used to support other wireline or wireless premises devices such as WLAN APs/routers, or MSO set-top boxes.

In another aspect, a method for managing paging notifications from two or more different wireless networks is disclosed. In one embodiment, the method includes: evaluating applications and placing them in groups based on user preferences; reporting the application/groups allocation(s) and their associated preferences to at least one of the networks; obtaining a set of rules; evaluating the set of rules to identify the components of the rule matching a data unit based on selection criterion; associating the data unit to the matching rule; and routing the traffic on the data unit based on the prioritized list of applications in the groups.

In yet another embodiment, the method includes allocating a unique IP address to a user device for each group such that a paging cause can be assigned to an application using the group IP address. In one variant, the user device receiving the paging cause determines whether to respond or not, and how to respond (e.g., which network to utilize to receive data associated with the page).

In another embodiment, the managing include grouping "important" applications into (1) "urgent" applications, wherein the user device receives paging notifications from the applications in this group any time; (2) "default" applications, wherein the UE receives paging notifications from the applications in this group only when it is not engaged in communication with any other networks; and/or (3) "ignore for now" applications, wherein the user device receives notifications from the applications in this group only when meeting certain criteria; e.g., when the current time is within a certain time period.

In additional aspect of the disclosure, computer readable apparatus is described. In one embodiment, the apparatus includes a storage medium configured to store one or more computer programs, and includes a program memory or HDD or SSD on a computerized device such as a 5G NR network entity (e.g., gNB) or UE device. In one variant, the one or more computer programs are configured to arbitrate access between two PLMNs (e.g., a 5G 3GPP PLMN and a non-3GPP PLMN).

In a further aspect of the disclosure, an enhanced 5G NR 3GPP UE (UEe) is disclosed. In one embodiment, the UEe includes: a receiver module, a transmitter module, and an application management module. In one variant, the UEe may further include: a processor apparatus; a wireless modem chipset in data communication with processor apparatus; a program memory in data communication with processor apparatus; a mass storage; and an RF front end module.

In further implementation, the program memory includes at least one program which is configured to, when executed to the processor apparatus, causes to perform a grouping scheme for applications utilized by the UEe based on their priority or importance to the user to be processed.

In another variant, the computerized mobile device further includes subscriber identity module logic in data communication with the data processor apparatus, the subscriber identity module logic configured to provide data enabling the establishment of the data communication with the first network management entity as well as establishment of the data communication with the second network management entity. In one implementation, the subscriber identity module logic is part of a common Universal Subscriber Identity Module (USIM) having two discrete SIM data sets.

In another aspect of the disclosure, a network architecture is disclosed. In one embodiment, the architecture includes enhanced entities configured to allow an enhanced UE to be aware of a different networks' paging requests, including while connected to the other network. In one variant, the architecture is applied within the same network operator (e.g., MNO or MSO). In another variant, the architecture is applied within different network operator (e.g., two different MNOs, two different MSOs, or between an MNO and MSO). In yet another variant, the architecture is adapted for use in a network sharing model (e.g., wherein two or more entities share at least portions of the infrastructure for their respective users or customers).

In another aspect of the disclosure, methods and apparatus enabling the user device to be aware of network paging based on priorities of applications utilized by the user device are disclosed.

In one variant, a mobile device (e.g., DSDS-capable UE) belongs to a first PLMN, while a second PLMN is used to provide additional (overlapping) network coverage.

In a further aspect of the disclosure, methods and apparatus for routing categorized data traffic to a UE are described. In one embodiment, the categorized data are associated to applications executed on the UE, which are categorized by the UE and the network such that a unique IP address is assigned to data packets in each category, allowing for mapping of IP packets receiving from each category to a specific paging cause, and consequently issuing the paging cause to the UE via paging notification(s).

In another aspect of the disclosure, network apparatus for use within a wireless network is disclosed. In one embodiment, the network apparatus includes an enhanced AF (Application Function) or AFe, and is configured to at least recognize prescribed input related to prioritized or managed application processing from the enhanced UE (UEe) so as to enable establishment of a managed paging awareness environment, including support of a managed application paging and data processing model. The apparatus may also generates enhanced URSP (UE Route Selections Policies) or URSPe rules for UEes, thereby allowing the UEes to process operative applications according to a prescribed management scheme.

In one variant, the network apparatus further includes an enhanced PCF (Policy Control Function) or PCFe process configured to at least recognize prescribed 3GPP 5G based network URSPe rules generated from the aforementioned AFe, and to inform the UEe of these URSPe rules and functions (including modifications thereto).

In another variant, the network apparatus includes an enhanced SMF (Session Management Function) SMFe process configured to map incoming data IP addresses associated with individual UE applications to various designated paging cause values.

In a further aspect, methods and apparatus for exerting operator control over user device use of DNNs is disclosed.

In another aspect, methods and apparatus for conserving network resources based on differentiated paging notification behavior is disclosed.

In another aspect, an integrated circuit (IC) device implementing one or more of the foregoing aspects is disclosed and described. In one embodiment, the IC device is embodied as a SoC (system on Chip) device. In another embodiment, an ASIC (application specific IC) is used as the basis of the device. In yet another embodiment, a chip set (i.e., multiple ICs used in coordinated fashion) is disclosed. In yet another embodiment, the device comprises a multi-logic block FPGA device.

These and other aspects shall become apparent when considered in light of the disclosure provided herein.

BRIEF DESCRIPTION OF THE DRAWINGS

FIG. 4B is a tabular representation of an exemplary embodiment of enhanced URSP rules implementing prioritized paging notification for a multi-USIM UE, according to the present disclosure.

FIG. 6B is a logical flow diagram illustrating another exemplary implementation of the method of FIG. 6.

FIG. 7A is a ladder diagram illustrating paging notification message and data flow according to one embodiment of the disclosure.

FIGS. 4-14 © Copyright 2020 Charter Communications Operating, LLC. All rights reserved. Other Figures © Copyright of their respective copyright holders.

DETAILED DESCRIPTION

Figure 1:
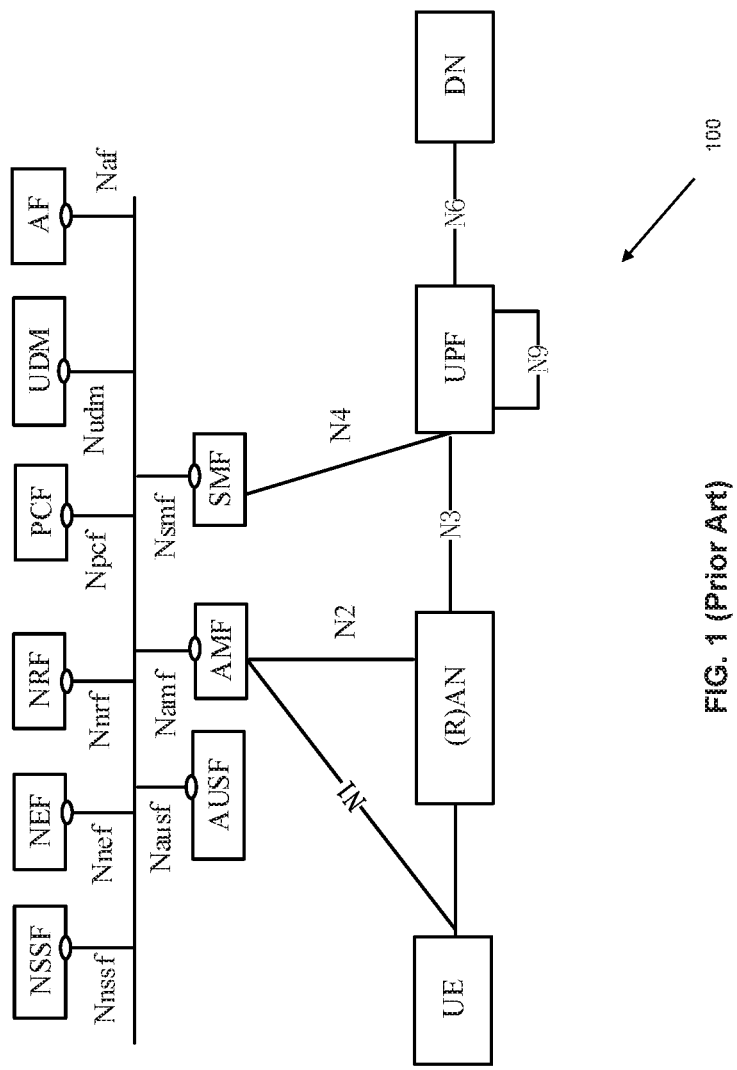
FIG. 1 is a functional block diagram of a prior art 5G system architecture and the various components thereof.
Figure 2A:
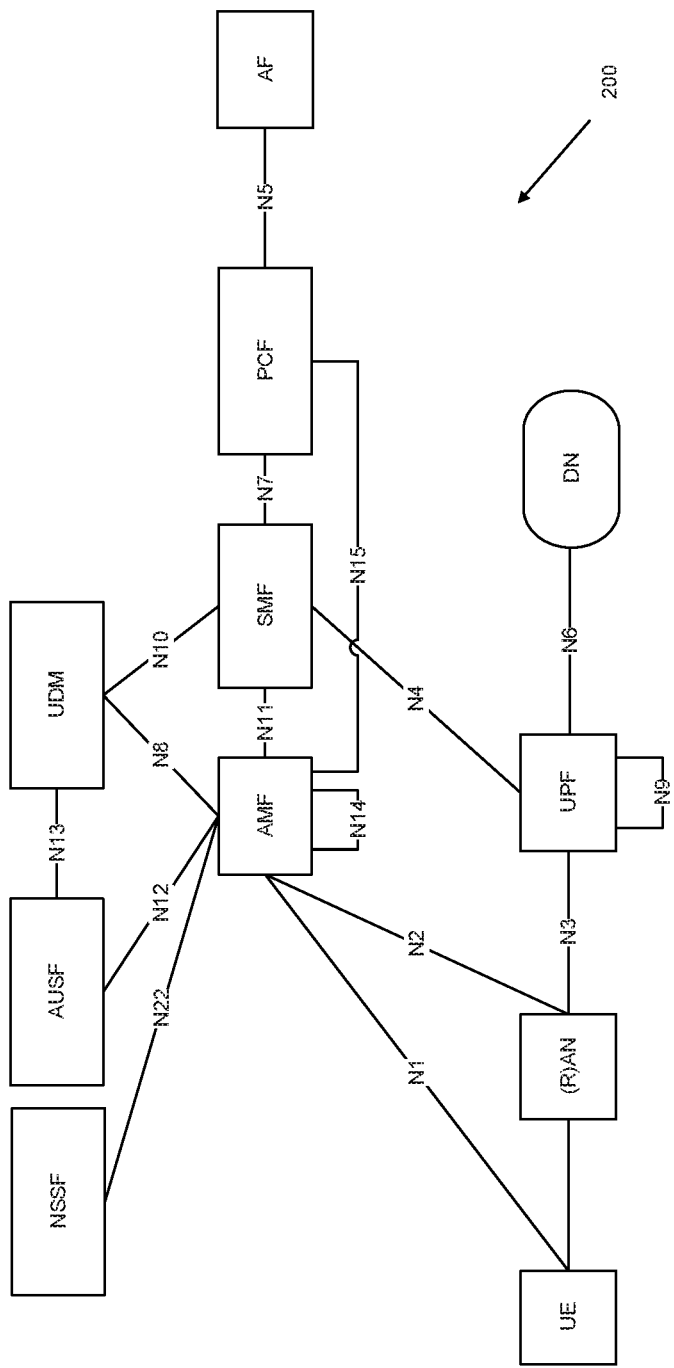
FIG. 2A is a functional block diagram of a prior art 5G system components and interfaces thereof.
Figure 2B:
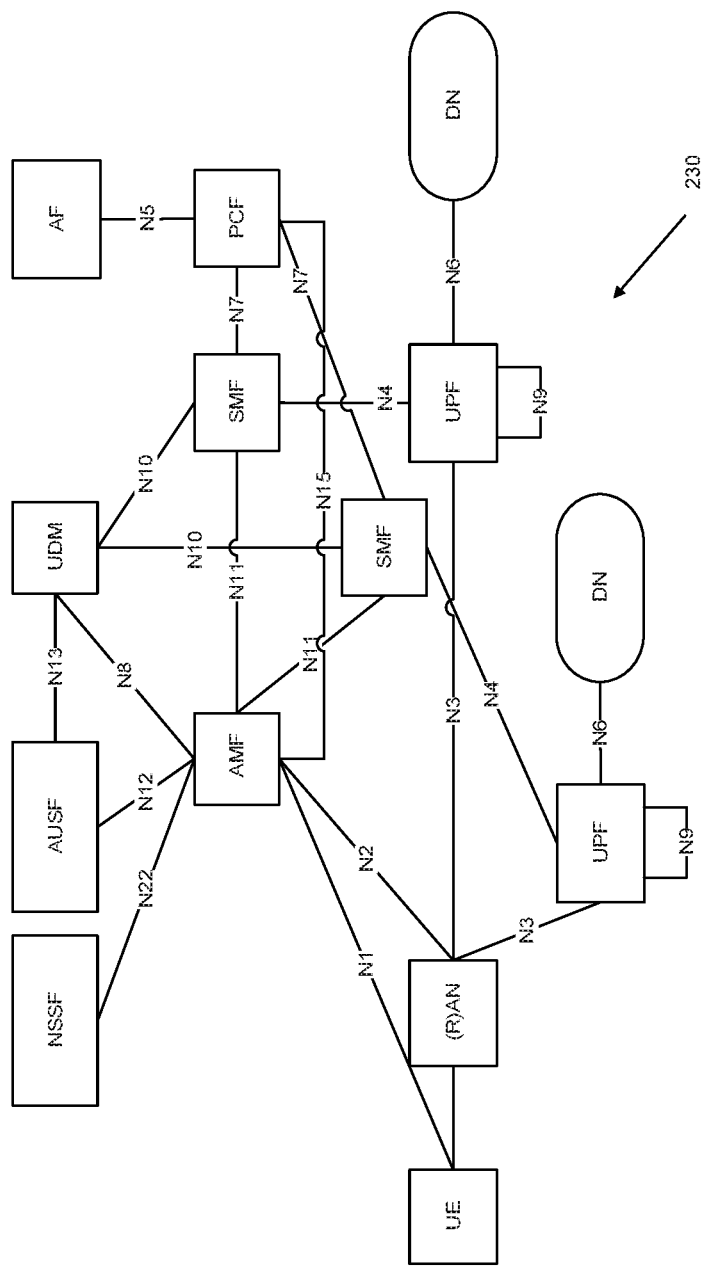
FIG. 2B is a functional block diagram of a prior art 5G system architecture and the various component thereof configured for multiple PDU sessions.
Figure 2C:
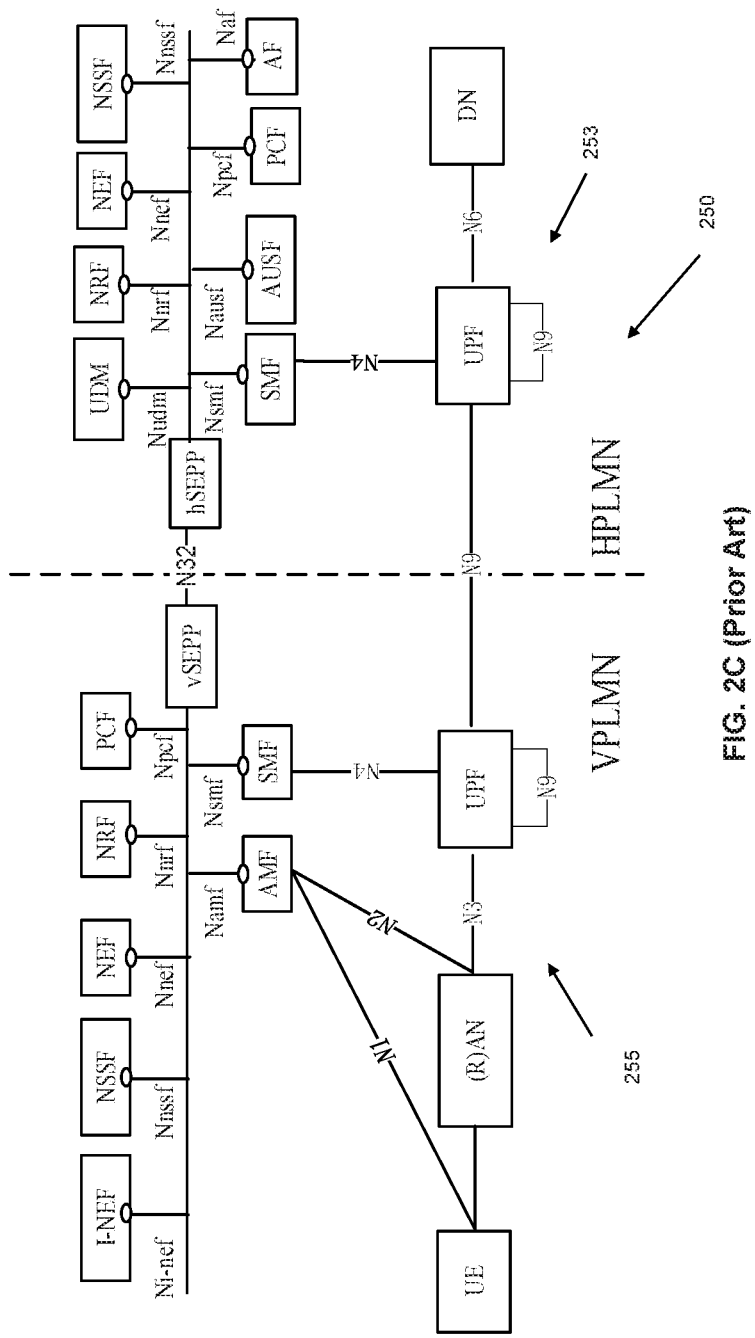
FIG. 2C is a block diagram showing the prior art 5G home-routed architecture as defined in 3GPP TS 23.501 (FIG. 4.2.4-3 thereof).
Figure 2D:
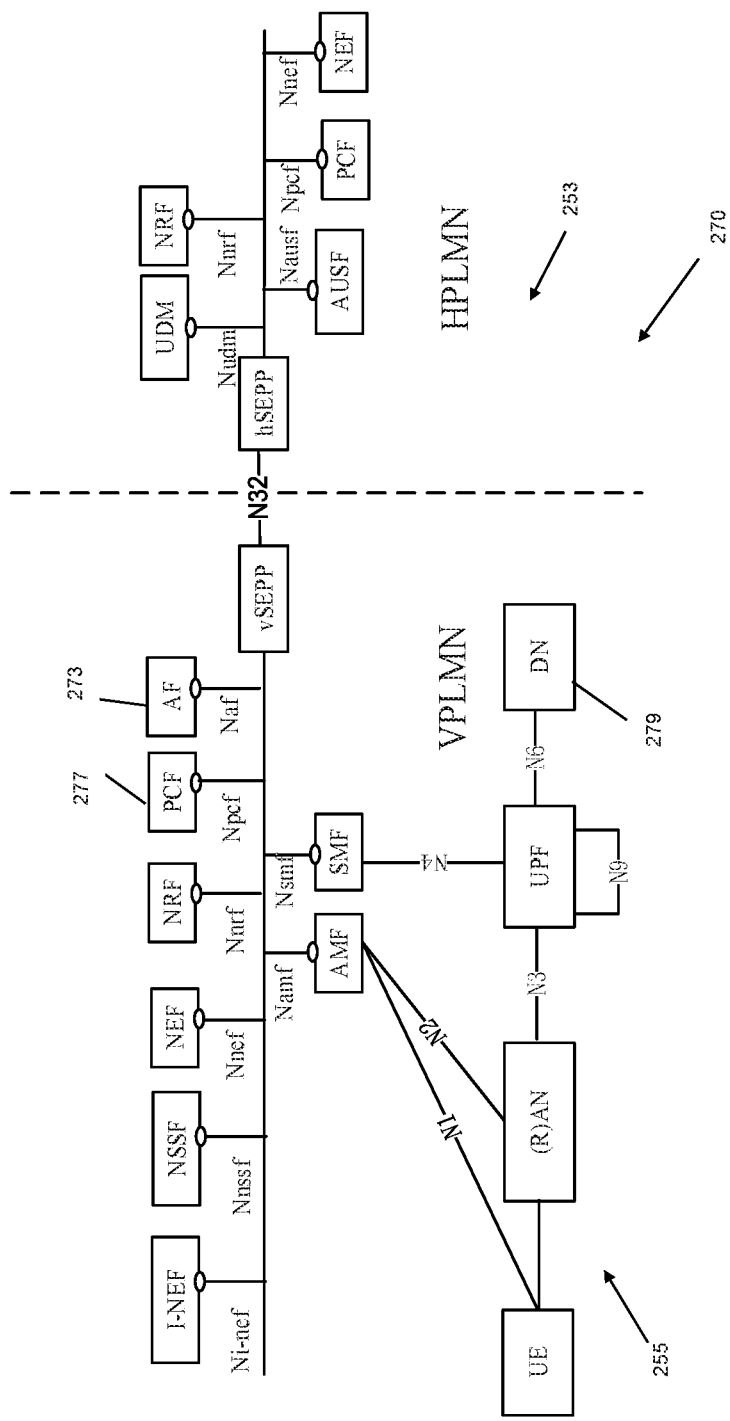
FIG. 2D is a block diagram showing the prior art 5G local breakout architecture as defined in 3GPP TS 23.501 (FIG. 4.2.4-1 thereof).

Reference is now made to the drawings wherein like numerals refer to like parts throughout.

As used herein, the term "access node" refers generally and without limitation to a network node which enables communication between a user or client device and another entity within a network, such as for example a 3GPP eNB or gNB, femtocell, small-cell, or CBRS CBSD.

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the term "CBRS" refers without limitation to the CBRS architecture and protocols described in *Signaling Protocols and Procedures for Citizens Broadband Radio Service (CBRS): Spectrum Access System (SAS)—Citizens Broadband Radio Service Device (CBSD) Interface Technical Specification*—Document WINNF-TS-0016, Version V1.2.1. 3, January 2018, incorporated herein by reference in its entirety, and any related documents or subsequent versions thereof.

As used herein, the terms "client device" or "user device" or "UE" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", smartphones, wireless nodes such as FWA devices or femtocells/small-cells, and vehicle infotainment systems or portions thereof.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "DOCSIS" refers to any of the existing or planned variants of the Data Over Cable Services Interface Specification, including for example DOCSIS versions 1.0, 1.1, 2.0, 3.0 and 3.1.

As used herein, the term "headend" or "backend" refers generally to a networked system controlled by an operator (e.g., an MSO) that distributes programming to MSO clientele using client devices, or provides other services such as high-speed data delivery and backhaul.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), 4G LTE, WiMAX, VoLTE (Voice over LTE), and other wireless data standards.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), 3D memory, and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., mmWave or 802.16), or other network service provider having infrastructure required to deliver services including without limitation voice and data over those mediums. The term "MNO" as used herein is further intended to include MVNOs, MNVAs, and MVNEs.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications technologies or networking protocols (e.g., SONET, DOCSIS, IEEE Std. 802.3, ATM, X.25, Frame Relay, 3GPP, 3GPP2, LTE/LTE-A/LTE-U/LTE-LAA, 5GNR, WAP, SIP, UDP, FTP, RTP/RTCP, H.323, etc.).

As used herein the terms "5G" and "New Radio (NR)" refer without limitation to apparatus, methods or systems compliant with 3GPP Release 15, and any modifications, subsequent Releases, or amendments or supplements thereto which are directed to New Radio technology, whether licensed or unlicensed.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "xNB" refers to any 3GPP-compliant node including without limitation eNBs (eUTRAN) and gNBs (5G NR).

Overview

In one exemplary aspect, the present disclosure provides improved methods and apparatus for enhanced wireless services which, inter alia, enable a client device (e.g., a 3GPP-compliant UE or mobile device) to manage or prioritize its connection across two or more mobile networks (e.g., PLMNs), including those of respective different operators and/or those of different types, such as for managing paging notifications.

In one embodiment, the existing 3GPP-based network paging model is extended so that the client device is aware of, and can process, paging notifications from the different networks and applications. Rather than using ToS as in the prior art, this embodiment uses enhanced URSP (UE Route Selection Policy) rules which enable paging causes send to the enhanced client device (UEe) to be correlated to Data Network Name (DNN) values specified by the user of the UEe.

In one implementation of the enhanced paging model above, the multi-USIM UE advantageously leverages the paging cause, which is based on Data Network Name (DNN) mapping performed by the network, such that the paging notifications are prioritized according to the importance of their associated applications, while a separate IP address is maintained for each application.

For instance, in one implementation, the operator network includes a portal (e.g., "Application Function") to allow the multi-USIM UEe user to group their important applications in a prioritized fashion such as: (i) "urgent," wherein a multi-USIM UE will receive notifications in any operational condition, (ii) "default," wherein the multi-USIM UE will receive notifications when it is not otherwise busy, or (iii) "ignore," wherein the multi-USIM UE does not receive notifications unless certain criteria are met (e.g., during certain time-period/day).

The enhanced Multi-USIM UEe as described herein can accordingly differentiate between the urgent and non-urgent paging notifications, in effect determining if a current session needs to be interrupted or not for replying to paging requests from another network.

Moreover, with such enhancements, a multi-USIM UEe can also operate in either PLMN (e.g., a "visited" or secondary PLMN, and a Home PLMN) so as to preserve services that require urgent response (such as important packet data functions which would otherwise be interrupted or ignored).

Advantageously, only comparatively minor modifications to extant 5G infrastructure and protocols are required to support the foregoing functionality.

Detailed Description of Exemplary Embodiments

Exemplary embodiments of the apparatus and methods of the present disclosure are now described in detail. While these exemplary embodiments are described in the context of the previously mentioned wireless access networks (e.g., 5G NR) associated with or supported at least in part by a managed network of a service provider (e.g., MSO and/or MNO networks), other types of radio access technologies ("RATs") and other types of networks and architectures that are configured to deliver digital data (e.g., text, images, games, software applications, video and/or audio) may be used consistent with the present disclosure.

It will also be appreciated that while described generally in the context of networks providing service to a customer or consumer or end user or subscriber (i.e., within a pre-scribed service area, venue, or other type of premises), the present disclosure may be readily adapted to various types of environments including, e.g., within an enterprise domain (e.g., businesses), or even governmental uses. Yet other applications are possible.

Moreover, the various aspects of the disclosure may be utilized consistent with various types of radio frequency spectrum (as well as the underlying RAT technologies), including licensed, unlicensed (e.g., LTE-U or LTE-LAA, or NR-U), or "quasi-licensed" spectrum such as CBRS spectrum, or even mmWave (e.g., such as 52.6-71 GHz ostensibly specified by 3GPP Release-17). Such spectrum types may be mixed as well, such as where a small-cell based network operates with unlicensed or quasi-licensed spectrum, and the macrocell network utilizes licensed spectrum.

Also, while certain aspects are described primarily in the context of the well-known Internet Protocol (described in, inter alia, *Internet Protocol DARPA Internet Program Protocol Specification*, IETF RCF 791 (September 1981) and Deering et al., *Internet Protocol, Version 6 (IPv6) Specification*, IETF RFC 2460 (December 1998), each of which is incorporated herein by reference in its entirety), it will be appreciated that the present disclosure may utilize other types of protocols (and in fact bearer networks to include other internets and intranets) to implement the described functionality.

Other features and advantages of the present disclosure will immediately be recognized by persons of ordinary skill in the art with reference to the attached drawings and detailed description of exemplary embodiments as given below.

Methodology

Figure 3:
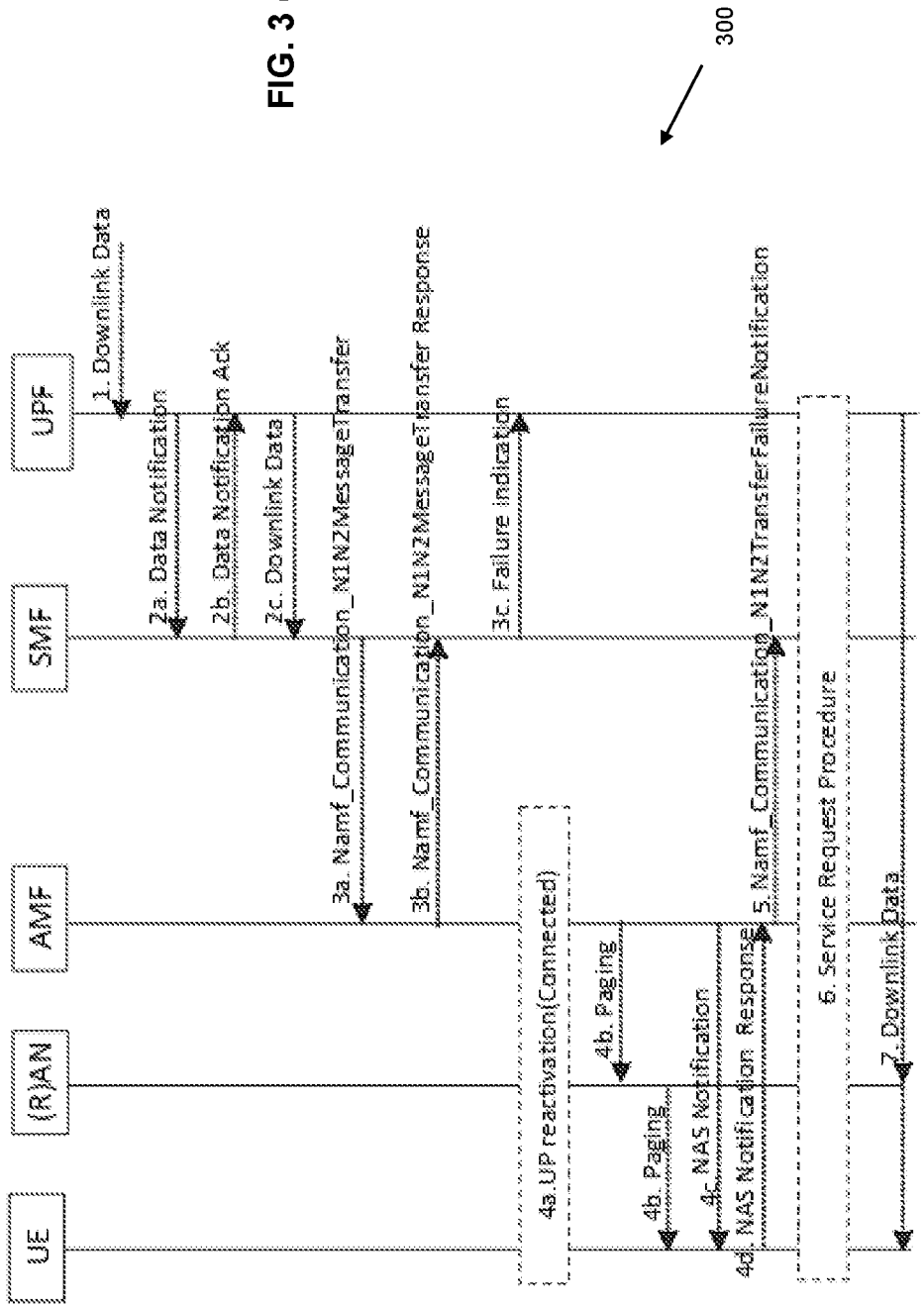
FIG. 3 is a block diagram showing a prior art approach for paging notification and data delivery to a UE within a 5G NR network.

As a brief aside, it is illustrative to first understand the prior art approach for paging notifications referenced previously (i.e., in the 3GPP 5G NR context) in greater detail. Specifically, FIG. 3 illustrates the prior art network-triggered service request operation proposed under 3GPP TS 23.502 (see FIG. 4.2.3.3-1 thereof). As shown in FIG. 3, downlink data is sent to the UPF (Step 1), which notifies the SMF (Step 2a). The SMF ACKs (Step 2b), and the data is downlinked to the SMF (Step 2c) Specifically, the UPF forwards the downlink data packets towards the SMF if the SMF instructed the UPF to do so, and the SMF buffers the transmitted data packets.

If the Paging Policy Differentiation feature is supported by the SMF and the PDU Session type is "IP", the SMF determines the Paging Policy Indicator, and optionally a paging cause, based on the DSCP in the Type of Service (ToS) (IPv4)/Traffic Class (TC) (IPv6) value from the IP header of the received downlink data packet. The SMF also identifies the corresponding QoS Flow from the QFI of the received DL data packet.

At Step 3a, Namf_Communication_N1 N2Message-Transfer occurs, including SUPI, PDU Session ID, N1 SM container (SM message), N2 SM information (QFI(s), QoS profile(s), CN N3 Tunnel Info, S-NSSAI, Area of validity for N2 SM information, ARP, Paging Policy Indicator, paging cause, 5QI, N1N2TransferFailure Notification Target Address, Extended Buffering support), or NF to AMF: Namf_Communication_N1N2MessageTransfer (SUPI, N1 message).

When it supports Paging Policy Differentiation, the SMF determines the Paging Policy Indicator and may also determine a paging cause related to the downlink data that has been received from the UPF or triggered the Data Notification message, based on the DSCP. See TS 23.501 clause 5.4.3. The SMF indicates the Paging Policy Indicator and the paging cause in the Namf_Communication_N1N2Message-Transfer discussed above.

Per Step 4b, if the UE is in CM-IDLE state in 3GPP access, and the PDU Session ID received from the SMF in Step 3a has been associated with 3GPP access and based on local policy the AMF decides to notify the UE through 3GPP access even when UE is in CM-CONNECTED state for non-3GPP access, the AMF may send a Paging message to NG-RAN node(s) via 3GPP access, including the paging cause.

Per Step 4c, if the UE is simultaneously registered over 3GPP and non-3GPP accesses in the same PLMN, and the UE is in CM-CONNECTED state for non-3GPP access and in CM-IDLE for 3GPP access, the AMF may decide to send the NAS Notification message containing the 3GPP Access Type to the UE over non-3GPP access including the paging cause.

Per step 4d, if the UE is simultaneously registered over 3GPP and non-3GPP accesses in the same PLMN, and the UE is in the CM-CONNECTED state for the non-3GPP access (and in CM-IDLE for the 3GPP access) and if the UE decides to not accept the incoming service the UE responds with NAS Notification response message over the non-3GPP access to indicate the same to the network.

Per step 5, a Namf_Communication (transfer failure notification) is sent from the AMF to the SMF pursuant to the above response, and per Step 6, the UE may choose to respond to the paging or NAS notification message based on the paging cause value, by executing service request procedure.

Hence, in essence, under the prior art scheme of FIG. 3, the DSCP value from the incoming IP packet will be mapped to a paging cause over the Uu (radio) interface to the UE. However, under such prior art scheme, a user of the UE is not able to set the paging cause differently between IP packets from different applications or sources (e.g., Skype vs. WhatsApp, etc.). This disability underscores a salient feature of the present disclosure; i.e., the ability to selectively manage and prioritize IP packets from various sources, based on e.g., user-based (and/or network-based) rules. This management and control allows, among other things, the user to structure situations if/when it receives paging notifications from certain particular applications, including when roaming or associating with a different PLMN.

Hence, referring now to FIGS. 4-6B, various embodiments of the methods of paging prioritization from different wireless networks based on e.g., application priority according to the present disclosure, are shown and described in detail. It will be appreciated that while these methods are described primarily in the context of a 3GPP-based (i.e., E-UTRAN and/or 5G NR) architecture, the various methods are in no way so limited, and may be readily adapted and applied to other types or configurations of wireless systems. Such adaptation and application being within the skill level of the ordinary artisan given the present disclosure, including other applications where a UE or mobile device includes two different SIM or similar credentials and is capable of operation with two different PLMNs.

Figure 4:
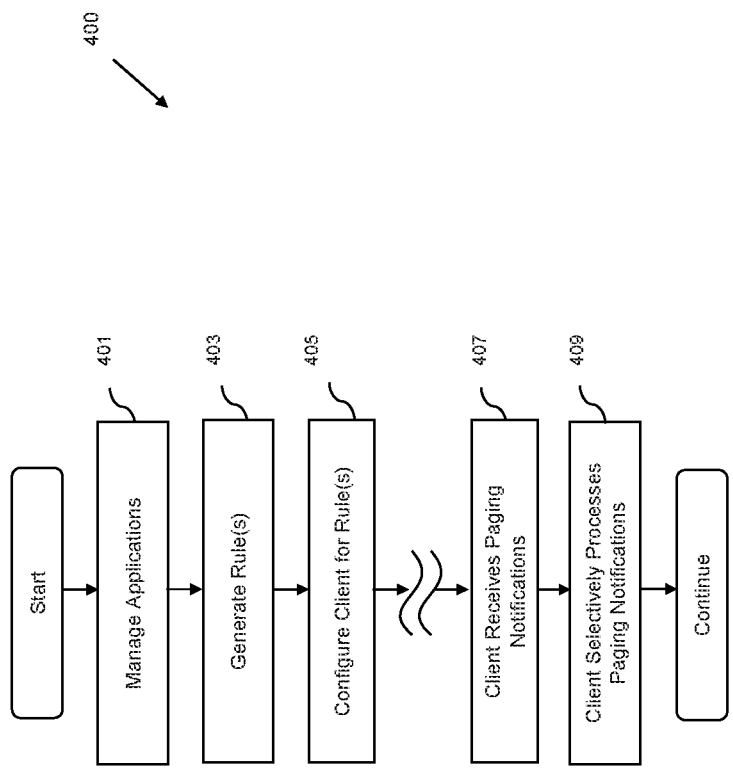
FIG. 4 is a logical flow diagram illustrating one embodiment of a generalized method of enhanced paging notification for a client device according to the present disclosure.

FIG. 4 shows one embodiment of the generalized method for prioritizing paging notifications by a multi-USIM UEe from different wireless network according to the present disclosure. It will be recognized that while FIG. 4 and various other methods and apparatus described subsequently herein are described in terms of application that are bound to a particular network (e.g., the UE can be configured to associate WhatsApp with PLMNa and Skype with PLMNb, or an IMS application associated with PLMNa while OTT video (e.g., Youtube) is associated with PLMNb), such association or bonding is not a requirement of practicing the invention.

It will further be appreciated that certain embodiments of the disclosure may be implemented such that a given application receives heterogeneous treatment within the different PLMNs. For example, a Skype application associated with a user device may be configured such that notification is implemented with a first priority/criteria set for PLMNa, but a different priority and/or criteria set (e.g., for relevant time periods) for PLMNb. As such, the user can if desired, differentiate the paging notification services provided by the network as described herein "intra-app" based on network identity. This intra-app differentiation may also have other criteria associated therewith, such as where the differentiated treatment on one PLMN versus another only applies in certain time periods, user contexts such as e.g., user location (based on e.g., association with a given Cell ID, GPS receiver-derived location), set of user apps then in use on the user device (e.g., when "App A" and "App B" are both active, then apply differentiation; otherwise no differentiation), or even battery charge state for the user (e.g., mobile) device.

As shown, the method 400 includes first managing (e.g., grouping or other designation) of user applications per step 401. As described in greater detail below, such managing or grouping may include for instance prioritization of applications, specification of certain behaviors or rules with respect to the application, or similar.

Per step 403, one or more rules are generated relating to the application(s). As discussed in greater detail below, these rules may be generated by the user (e.g., via a portal or similar enhanced application function (AFe) configured to allow such rule generation and management, by the network, by one or more third parties (e.g., those providing the underlying service of an app), or combinations thereof.

Per step 405, the client device is configured for the generated rule(s). For instance, in one variant, the client includes logic to receive and process paging notifications from a given network according to the rule(s), such that the paging requests are e.g., processed immediately under any operational conditions, processed only when certain operational or other conditions are met, ignored, etc.

Per step 407, the configured client subsequently receives the paging notifications, and processes them per step 409 according to the rule(s) which it is configured to implement.

Figure 4A:
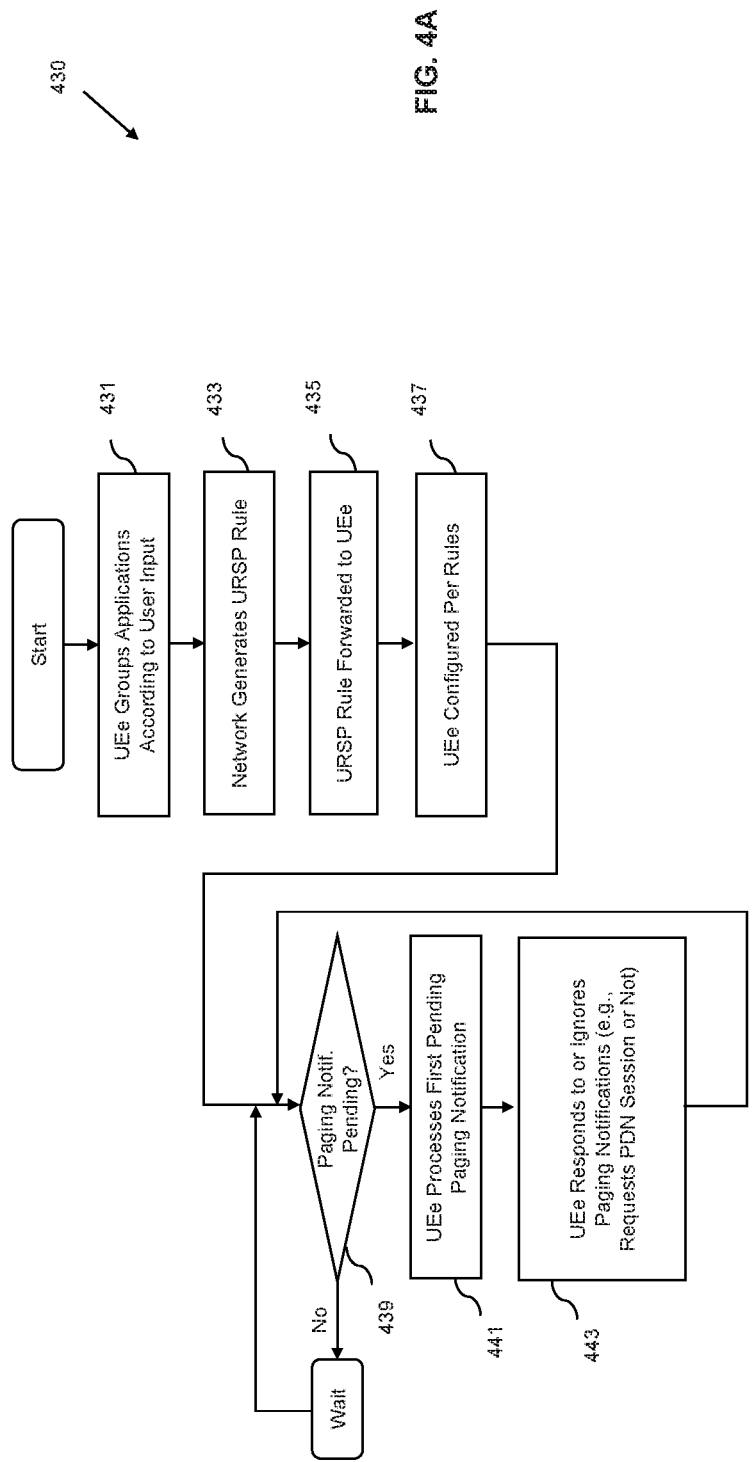
FIG. 4A is a logical flow diagram illustrating one implementation of the generalized method of FIG. 4; i.e., for paging notification of a DSDS multi-USIM UEe with prioritized paging functionality according the present disclosure.

Referring now to FIG. 4A, one implementation of the generalized method of FIG. 4 is described in the context of an enhanced 3GPP MUSIM UE (UEe) with paging processing and discrimination capability as described herein. As shown, the method 430 of FIG. 4A includes first prioritizing or grouping applications based on their level of importance per step 431, and sending the prioritized or grouped applications list(s) to the network. For instance, as described further herein, the network in one embodiment includes a portal (e.g., AFe) that allows the multi-USIM UEe user to logically or functionally group their applications, with a Data Network Name (DNN) being designated for each group.

Per step 433, the network generates enhanced UE Route Selection Policy (URSPe) rules. The URSPe rules are generated based on multi-USIM UEe input from step 431. These rules allow the multi-USIM UEe to use a designated DNN on a per-group basis. One example of URSPe rules is shown in FIG. 4B. As shown, a name format of "DNN x" (where x is an integer) is used in this embodiment, although other formats and conventions may be used consistent with the disclosure.

As a brief aside, routing selection priorities for a 3GPP 5G NR UE as provided from the network are specified as UE Route Selection Policy (URSP). The policy rules are maintained by the PCF and are initially transferred to the UE, such as during network registration or Packet Data Unit (PDU) session establishment. The UE uses these policies to help determine which 3GPP or non-3GPP access to prioritize or prefer when multiple options are available to it. Accordingly, the URSP can assist in mobile data offload to non-3GPP networks such as IEEE Std. 802.11 (Wi-Fi). The URSP can further be used for selection of network slices and PDU sessions for user plane traffic.

Returning to FIG. 4A, per step 435, the network forwards the enhanced (URSPe) rules to the multi-USIM UEe. Once the multi-USIM UEe receives the URSPe rules, it configures itself in one variant by assigning the applications (as identified by their Application Identifier/Traffic Descriptor) to their respective DNN values (step 437). See e.g., 3GPP TS 23.501 and 23.503, each incorporated by reference in its entirety herein, regarding exemplary UE use of URSP data. For instance, in one implementation, the URSPe data can be used by the UEe of the present disclosure to setup PDU session establishment using a specific DNN value per application. Per TS. 23.503 the UE Route Selection Policy (URSP) can be used by the UE to (i) determine if a detected application can be associated to an established PDU Session, (ii) can be offloaded (e.g., to a non-3GPP access outside of a PDU Session), or (ii) can cause establishment of a new PDU Session. In the exemplary implementation, the URSPe rule includes one Traffic descriptor that specifies the matching criteria, as set forth in TS 23.503, although it will be appreciated that other approaches may be used consistent with the disclosure.

Per step 439, the multi-USIM UEe determines if any pending notifications exist (whether by a periodic polling mechanism, direct notification message, or otherwise), and processes the first pending paging notification per step 441. The multi-USIM UEe determines application handling according to the URSPe rules and lastly, per step 443, depending on the application handling/priority, the multi-USIM UEe may respond to the paging by establishing the user plan connection or ignore the page notification by not establishing the user plan connection with the paging network. The logic then returns to step 439, wherein any remaining notifications are processed similarly to the first.

Figure 4C:
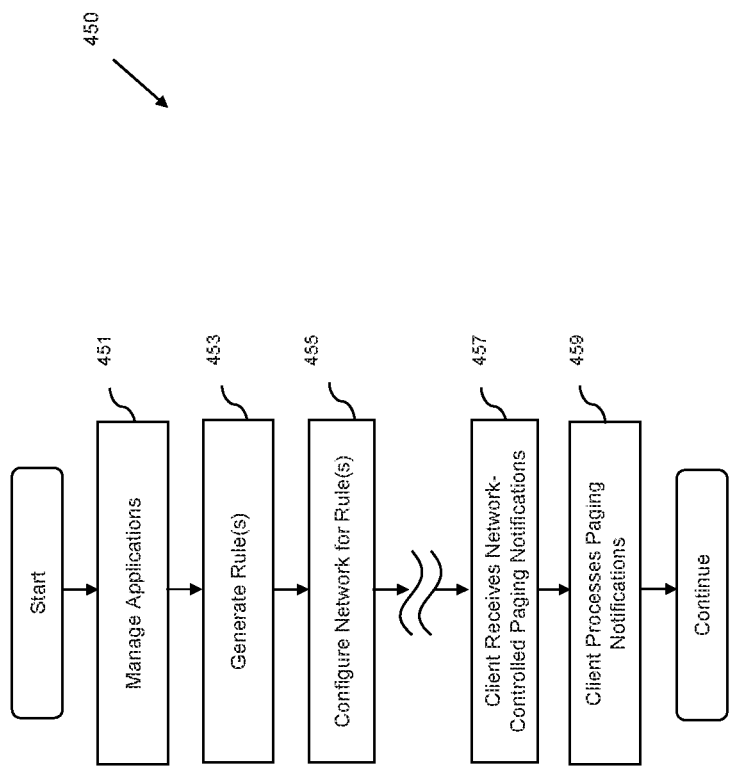
FIG. 4C is a logical flow diagram illustrating another embodiment of a generalized method of enhanced paging notification for a client device according to the present disclosure, wherein network-based processing is utilized.

It will be appreciated that while the generalized embodiment of FIG. 4 is cast in terms of client configuration and processing, the serving network(s) themselves can in some embodiments also or alternatively be configured to implement the rule(s) on behalf of a given client. For example, see the methodology 450 of FIG. 4C, which is a logical flow diagram illustrating another embodiment of a generalized method of enhanced paging notification for a client device according to the present disclosure, wherein network-based processing is utilized. Specifically, in this embodiment, the method 450 includes first managing (e.g., grouping or other designation) of user applications as described elsewhere herein, per step 451.

Per step 453, one or more rules are generated relating to the application(s). As discussed elsewhere herein, these rules may be generated by the user (e.g., via a portal or similar enhanced application function (AFe) configured to allow such rule generation and management, by the network, by one or more third parties (e.g., those providing the underlying service of an app), or combinations thereof.

Per step 455, the network is configured for the generated rule(s). For instance, in one variant, the network includes logic to receive incoming data from an application source (e.g., remote network server) such as via a network UPF (discussed below in greater detail with respect to FIG. 7) and process the data according to a prescribed rule set (or multiple rule sets) in order to determine (i) whether paging notifications need be issued to the particular UEe, (ii) paging cause mapping required, if any, and (iii) conduct of the paging according to the rule(s), such that the paging requests are e.g., processed immediately under any operational conditions, processed only when certain operational or other conditions are met, ignored, etc. In this regard, in contrast to the client-driven processing of the received paging data discussed with respect to FIG. 4, the embodiment of FIG. 4C allows the client device (UE) to be less capable (or even unenhanced; i.e., an off-the-shelf UE), since it can merely be configured to process all notifications it receives when they are received, with the upstream network processes determining how and when such notifications are to be issued to that UE per its particular rule set(s).

Per step 457, the client subsequently receives the paging notifications, and processes them per step 459 as it would any other paging notification.

Figure 5:
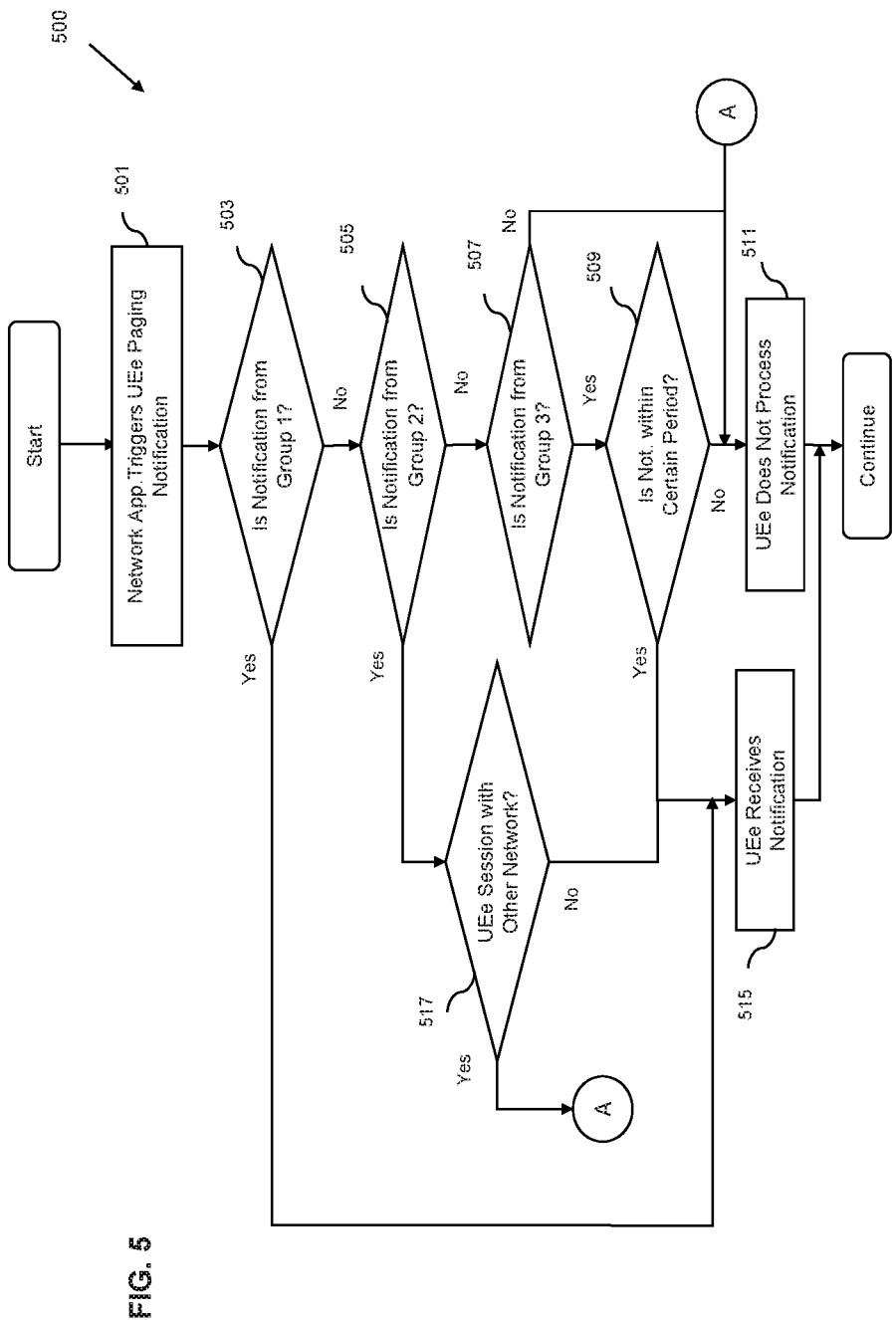
FIG. 5 is a logical flow diagram illustrating one embodiment of a method for prioritizing of paging notifications of a multi-USIM UEe according the present disclosure.

Referring now to FIG. 5, one embodiment of a method for processing applications based on their level of importance is shown and described. This methodology is described in the context of the 3GPP-based URSP rule(s) shown in FIG. 4B, although it will be appreciated that it may be adapted to other rules and applications (including 3GPP and non-3GPP uses) by those of ordinary skill given the present disclosure.

Per step 501 of the method 500, while the multi-USIM UEe is connected to its current data network (e.g., PLMNa), an application routed through another data network (e.g., PLMNb) sends the multi-USIM UEe a paging notification.

Per step 503, the multi-USIM UEe determines whether the notification is associated with an application which needs "urgent" response. In this embodiment, the "urgent" applications are placed in Group1 as shown in FIG. 4B. The multi-USIM UEe receives notifications from these Group 1 applications even when the multi-USIM UEe is engaging in a communication session (in RRC Connected state) with its current data network (e.g., PLMNa). If the application is an urgent application, the method proceeds to step 515, otherwise it proceeds to step 505.

Per step 505, the multi-USIM UEe next determines whether the application is a "default" application (Group 2); the multi-USIM UEe receives notifications from these applications only when it is not engaged in a communication session with its current data network (e.g., PLMNa) per step 517. If the application is a default Group application, the method proceeds to step 517, otherwise it proceeds to step 507.

Per step 507, the multi-USIM UEe determines whether the application is an "ignore for now" application; the "ignore for now" applications are placed in Group 3, and the multi-USIM UEe does not receive paging notifications from these applications unless certain criteria are met; e.g., it is within certain time-period/date (e.g., the UEe receives notifications from these applications after midnight but before 4 AM, or only during a weekend).

If Group 3, then per step 509, the multi-USIM UEe determines whether the application is within the prescribed time-period, during which such paging notifications are allowed to be processed (e.g., establish user plane connection). If the paging notification is within certain time-period, the method 500 proceeds to step 515; otherwise it proceeds to step 511, wherein the UEe does not process the notification (e.g., does not establish user plane connection).

Figure 6:
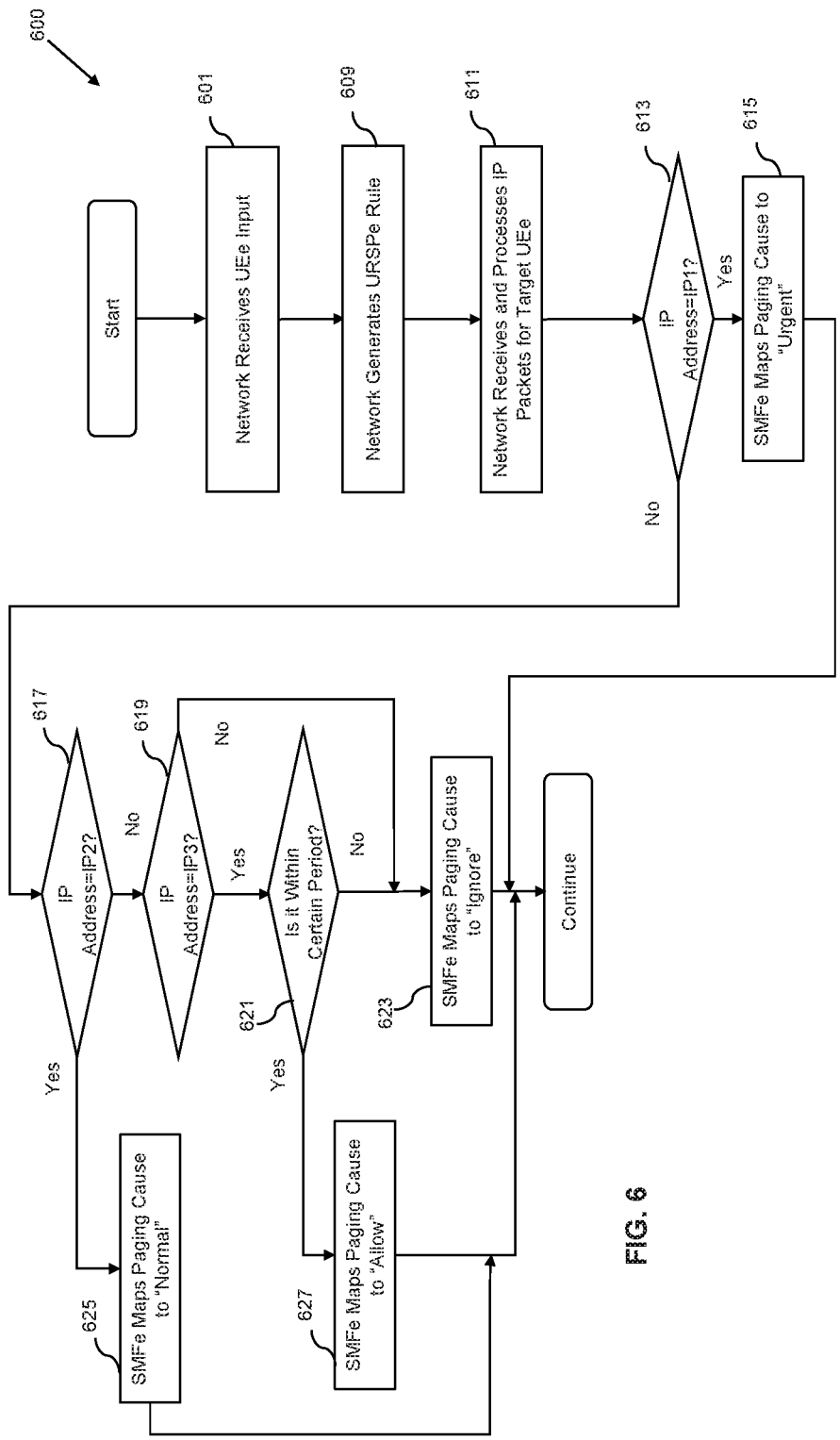
FIG. 6 is a logical flow diagram illustrating an embodiment of a method network operation with prioritized paging functionality according the present disclosure.

Referring now to FIG. 6, one embodiment of a method 600 for processing paging notifications for a multi-USIM UEe within a mobile network is described.

Per step 601 of the method 600, the network receives the multi-USIM UEe input regarding the prioritization applications, such as directly from the UEe or via an AFe as described elsewhere herein. For instance, in one embodiment, the multi-USIM UEe designates applications which are correlated to DNNs, with each DNN corresponding to a unique IP address to be assigned to UE as source IP address.

As an example, the applications belonging to Group 1 are assigned to DNN 1, which corresponds to IP address WWW.XXX.YYY.ZZZ. Likewise, the applications that belong to Group 2 are assigned to DNN 2, which corresponds to IP address AAA.BBB.CCC.DDD, and so forth.

Per step 602, the network generates one or more URSPe rule sets (e.g., FIG. 4B) according to the reported input from the multi-USIM UEe at step 501. As previously noted, these URSPe rules define the application precedence, and associate the applications traffic to different DNNs.

Per step 611, the network (UPF) receives the IP packets from the sources associated with the application(s)—such as a remote or networked packet server—and evaluates the destination IP address field used in their IP packet. In this embodiment, the designated IP addresses of the packets are used to determine the paging notification type such as e.g., "urgent," "normal" or "ignore for now" and are specific to particular UEe.

Per step 613, if the IP address is equivalent to a prescribed value (e.g., IP1), the method proceeds to step 615, where the Session Management Function (SMFe; see discussion of FIG. 7 below) in the network maps the paging cause value to "urgent." In this case, if the multi-USIM UEe is actively communicating with its current networks (e.g., PLMNa), it will disconnect from its current network, and connect to the other network (e.g., PLMNb) as required.

Per step 617, if the IP address is equivalent to another prescribed value such as IP2, the method proceeds to step 625, where the SMFe in the network maps the paging cause to "normal." Since this is a default behavior, the network may or may not map this to paging cause depending on its current connectivity. For example, if the multi-USIM UEe is actively communicating with its current network (e.g., PLMNa), it does not answer to the paging request. On the other hand, if the multi-USIM UEe is not actively communicating to its current network (e.g., PLMNa), then it will answer the paging request.

Per step 619, if the IP address is equivalent to e.g., IP3, the method proceeds to step 621, and if the paging has been requested within a certain time period/day (e.g., after midnight, weekend), it proceeds to step 627. Otherwise, the method proceeds to step 623, and the SMFe instructs the UPF to discard these packets.

Per step 627, since the paging has occurred within the certain time period/day, the SMFe maps the paging cause to "allow," and the multi-USIM UEe answers the paging request.

Figure 6A:
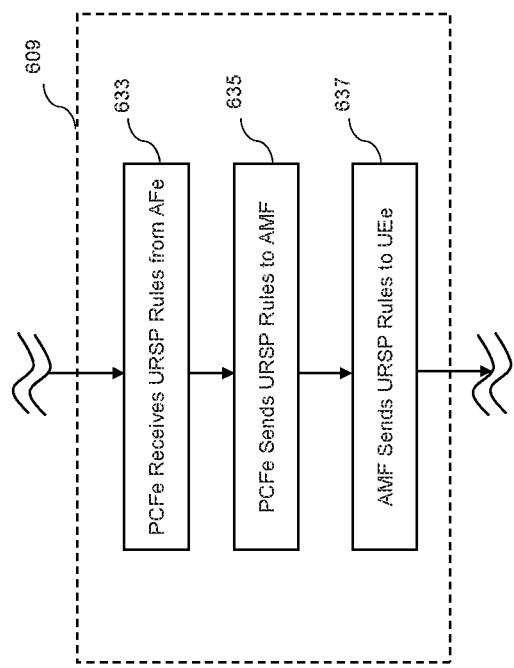
FIG. 6A is a logical flow diagram illustrating an exemplary implementation of the method of FIG. 6.

Referring to FIG. 6A, one specific implementation of step 609 of method 600 is shown and described.

Per step 633, the enhanced Policy Control Function (PCFe) in the network receives the URSPe rules from the Application Function (AFe). The USRPe rules are stored in Unified Data Repository (UDR) or associated storage (see discussion of FIG. 7 below).

Per step 635, the PCFe sends the URSPe rules to the Application Management Function (AMF).

Lastly, per step 637, the receiving AMF sends the URSPe rules to the multi-USIM UEe via the NG-RAN and Uu air interface.

As a brief aside, when a UEe attaches to the network, the PCFe receives the URSPe rules for this particular UEe from the UDR. If the URSPe rules are modified, the PCFe receives a new URSPe rules from the UDR, and forwards the new rules to the multi-USIM UEe. As such, the UEe is constantly kept informed of the latest iteration of the USRPe rules.

Referring now to FIG. 6B, one specific implementation of step 611 of method 600 is shown and described.

Per step 653, the User Plane Function (UPF) of the network screens/processes the incoming IP packets received at the network, such as from a remote IP packet source or application server.

Per step 655, if the N3 interface is connected (a GTP tunnel exists for this multi-USIM UEe), and the UPF maps the resulting paging cause based on the IP address of the incoming packet (i.e., the destination UEe) at step 657. Furthermore, on the N4 interface, information is added to indicate paging cause mapping rules for one or more DNN values. For instance, IP traffic from DNN 1 will map to paging cause 2, IP traffic from DNN 2 will map to paging cause 4, and so forth. If the N3 interface is not connected (e.g., the multi-USIM UEe is in idle state), the method proceeds to step 665, and uses the N4 interface to forward the IP packet header to the SMFe.

Per step 666, the SMFe maps the paging cause based on the UE's IP address received from packet header.

Per step 667, the SMFe includes the paging cause in a Nanf_Communication_N1N2MessageTranser message; then, the AMF sends the paging cause to the NG-RAN.

Per steps 661 and 663, the NG-RAN receives the transmitted paging cause and sends it to the multi-USIM UE via the Uu interface. When the multi-USIM UEe receives the paging cause, the multi-USIM UEe can use this paging cause to determine the response to the network (e.g., alert the user, reject the paging, ignore the paging, receive the paging and data while keeping the phone in the silent node, etc.).

Network Architecture for Paging Prioritization—

Figure 7:
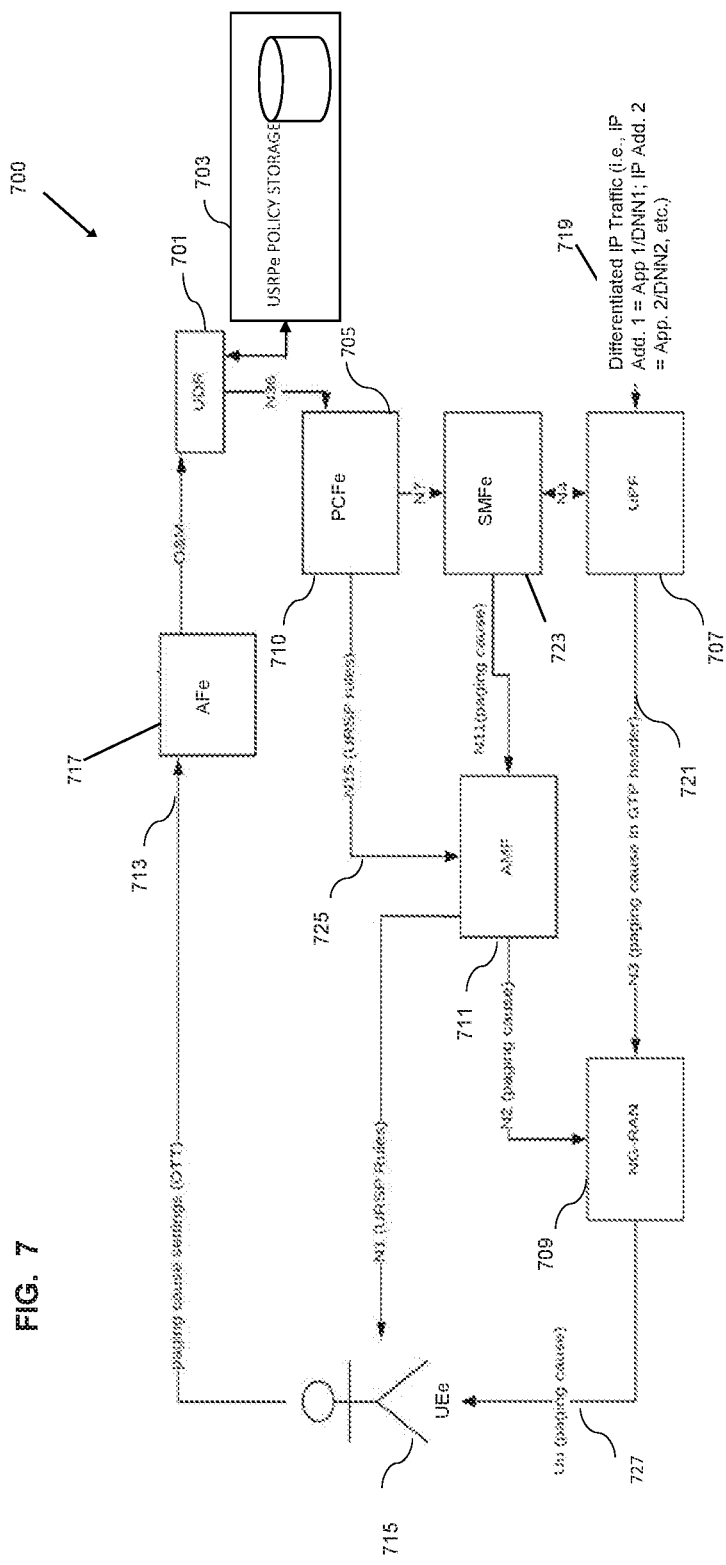
FIG. 7 is a block diagram of one embodiment of an enhanced 5G network architecture according the present disclosure.

Referring now to FIG. 7, one exemplary embodiment of a 5G network configuration for implementing managed or prioritized paging procedures according to the present disclosure is shown and described. Specifically, as shown in FIG. 7, the architecture 700 includes one or more enhanced UE (UEe) 715 having multiple USIMs and DSDS capability, one 5G NG-RAN 709, an enhanced AF (AFe) 713, an enhanced PCF (PCFe) 717, an enhanced SMF (SMFe) 705, a UPF 707, as well as a UDR 701 and associated storage 703 for storing URSP/USPRe rules and policies. It will be appreciated that both traditional or extant USRP policies and rules ("USRP rules") as well as enhanced policies and rules which include application and notification differentiation as described herein ("USRPe rules") may each be managed and stored by the network.

Although one NG-RAN 709 is shown in FIG. 7, it will be appreciated that configurations with different numbers of and/or other type of RANs may be utilized consistent with the present disclosure in addition to those described subsequently herein.

In the exemplary embodiment, the UEe 715 groups the applications based on their priority, and sends the list of applications in each group to the AFe 713 (such as via the OTT process shown). Furthermore, in the exemplary embodiment, the user subscription records as well as USRP/URSPe rules for the UEe 715 are stored in the UDR policy storage database 703, via use of a Q&M interface 717 from the AFe 713.

As noted previously, various policies or rules can be specified in order to provide "differentiated" paging and packet delivery functions within the architecture 700. As further examples certain applications associated with the UEe (e.g., App. 1, App. 2) may be grouped to use a particular DNN value (e.g., DNN 1), as previously described. IP traffic associated with DNN1 can be pages with a first paging cause value (e.g., X1). In one variant, the paging cause is encoded as a numeric value from 0 to 7 (e.g., 000 to 111 when encoded using three bits). The value "X1" can be mapped to e.g., the integer value "4" in that range. Similarly, a value of "0" can be reserved for highest (e.g., emergency) priority paging causes. Other values may be reserved by the operator such as for 3GPP IP Multimedia System (IMS) services.

As shown, when the UEe 715 attaches the network 700, the PCFe 710 receives the URSP/USRPe rules from the UDR 701 via the interface N36, forwards these rules to the AMF 711 via the interface N15, and then the AMF 711 forwards the URSP/USRPe rules to the UEe 715 via interface N1. Notably, the IP traffic received at the UPF (e.g., from a networked application server or other source) is sent from NG-RAN 709 to the UEe 715 via the Uu interface 727.

If the USRPe rules are modified, for instance when the priority of applications changes based on user input, the PCFe 710 receives new URSPe rules data from the UDR 701, and then forward these new rules to the UEe 715 via interfaces N15 and N1 through the AMF 711.

The UPF 707 processed the incoming IP traffic (which in this case is "differentiated" based on certain traffic being associated with different IP addresses which are each associated with the UEe 715) via the N6 interface 719, and forwards the traffic to the appropriate UEe. As described herein previously, if the UEe is in RRC CONNECTED or RRC INACTIVE state, the UPF 707 utilizes the N3 interface 721 to forward the IP traffic to the UEe 715. Otherwise, when the UEe is in RRC IDLE state, the UPF utilizes the N4 interface 723 to forward the IP traffic to the UEe 715.

Also, present in the architecture of FIG. 7, is a modified N4 interface 723. In the present embodiment, a new information capability is added to the N4 interface which may be used to indicate the paging cause mapping rule for DNNx values. For instance, IP traffic from DNN 1 will map to paging cause 2; IP traffic from DNN 2 will map to paging cause 4, and so forth. The paging cause is in one embodiment placed in the GTP header, and is sent to NG-RAN via the N3 interface 721 (or via the N11/N2 interfaces and the AMF 711).

Furthermore, in the present architecture, the PCFe 710 installs a Policy Control and Charging (PCC) rule on the SMFe 705 via the interface N7, which adds new information to the paging cause mapping rule in order to map the IP traffic to the appropriate paging cause values. For instance, IP traffic from DNN 1 will map to paging cause 2, and IP traffic from DNN 2 will map to paging cause 4 in the above example.

FIG. 7A is a ladder diagram illustrating an exemplary communication flow between the UEe 715, data store 703, AFe 713, PCFe 710, SMFe 705, UDR 701, UPF 707, and AMF 711 referred in FIG. 7.

Figure 8:
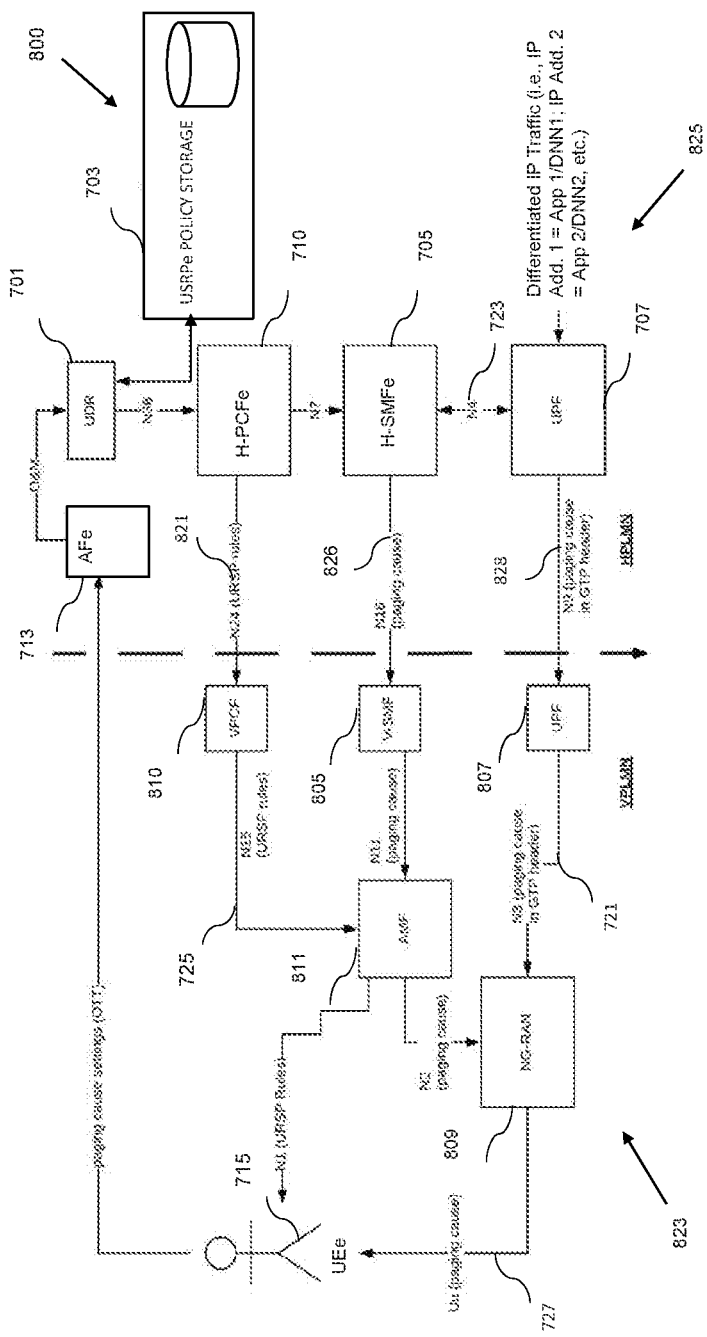
FIG. 8 a block diagram of one embodiment of an enhanced multi-network (i.e., HPLMN/VPLMN) roaming architecture according the present disclosure.

Referring now to FIG. 8, an exemplary embodiment of network configuration for implementing the managed/prioritized paging procedure in roaming scenarios according to the present disclosure is shown and described.

Specifically, as shown in FIG. 8, the architecture 800 includes one or more enhanced UE (UEe) 715 having multiple USIMs, as well as Home PLMN (HPLMN) 825 and Visited PLMN (VPLMN) 823, although it will be appreciated that configurations with different numbers of and/or other types of PLMNs and/or RANs may be utilized consistent with the present disclosure in addition to those described subsequently herein. HPLMN and VPLMN may belong to the same or different network operators or types of operators (e.g., MNOs and/or MSOs, or other types of entities). In this exemplary embodiment, the UEe 715 subscriber profile is configured in the HPLMN 805 (the home network of the subscriber, such as one managed by the MSO). VPLMN 823 shares its coverage with HPLMN 825 when the UEe leaves the HPLMN 825. As a brief aside, the N9 interface provides (H)UPF to (V)UPF communication, the N16 interface provides (H)SMFe to (V)SMF (or (V)SMFe) communication, and the N24 interface provides (H)PCF to (V)PCF(e) interface.

In the illustrated configuration 800, the user subscription record as well as URSP/USPRe rules for the UEe 715 are stored in the UDR database 701 in the HPLMN 805. As shown, when the UEe 715 attaches to the visited network 823, the VPCF 810 receives the URSP/USRPe rules from the UDR 701 via the HPCFe 710. The AMF 811 receives the URSP/USRPe rules from the VPCH 810 via the interface N15, and forwards to the UEe via the N1 interface.

Also, in the present architecture, the HPCFe 710 installs a Policy Control and Charging (PCC) rule on the HSMFe 705 via the interface N7, which adds new information to the paging cause mapping rule in order to map the IP traffic to the appropriate paging causes. The VSMF 805 receives the mapping rule and paging cause from the HSMFe 705 via the N16 interface, which is forwarded to the UEe 715 via AMF 811 and the interface N11 and N2 to the NG-RAN.

The (H)UPF 707 screens the incoming IP traffic received via the N6 interface 719, and forwards the traffic to the appropriate UEe application/process based on IP address. As described herein previously, if the UEe is in RRC CONNECTED state, the HUPF 707 sends the incoming IP packets to the VUPF 807 via the N9 interface 828, and then the VUPF 807 utilizes the N3 interface 721 to forward the IP traffic to the UEe 715. Otherwise, when the UEe is in RRC IDLE state, the HUPF 707 utilizes the N4 interface 723 to forward the IP traffic to the HSMF 705, and then the HSMF 705 forwards the VSMF 805 via the interface 826. The VSMF 805 receives the IP traffic, and forwards it to the UEe 715, via AMF and the N15 interface 725.

It will also be recognized that mechanisms for maintaining IP address continuity across various different networks such as two PLMNs (e.g., a VPLMN and HPLMN, such as where one is an enterprise network having overlapping coverage with a larger cellular or MNO PLMN) may also be utilized consistent with the architecture 800 of FIG. 8. For example, the methods and apparatus described in co-owned and co-pending U.S. patent application Ser. No. 16/842,352 filed Apr. 7, 2020 and entitled "APPARATUS AND METHODS FOR INTERWORKING IN WIRELESS NETWORKS," incorporated herein by reference in its entirety, may be used for such purposes.

PCFe Apparatus—

Figure 9:
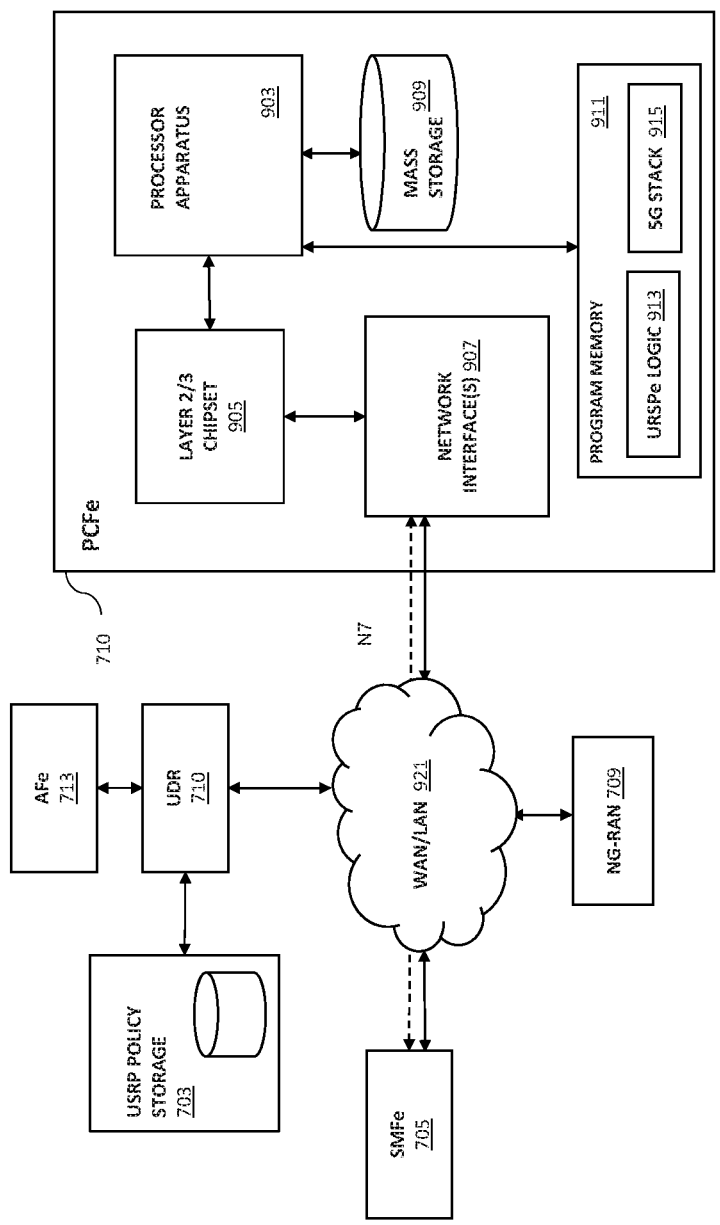
FIG. 9 is a functional block diagram illustrating an exemplary embodiment of an enhanced PCF (PCFe) apparatus useful with various embodiments of the present disclosure.

FIG. 9 illustrates an exemplary embodiment of an enhanced 5G PCF (PCFe) apparatus 710, useful for operation in accordance with the present disclosure.

In one exemplary embodiment as shown, the PCFe 710 includes, inter alia, a processor apparatus or subsystem 903, a program memory module 911, mass storage device 909, and network interfaces 907 for communications with the relevant 5G-RAN or other entities such as SMF/SMFe 705 previously described herein, the NG-RAN 709, and the UDR 710.

In the exemplary embodiment, the processor 903 may include one or more of a digital signal processor, microprocessor, field-programmable gate array, or plurality of processing components mounted on one or more substrates. The processor 903 may also comprise an internal cache memory, and is in communication with a memory subsystem 911, which can comprise, e.g., SRAM, flash and/or SDRAM components. The memory subsystem may implement one or more of DMA type hardware, so as to facilitate data accesses as is well known in the art. The memory subsystem of the exemplary embodiment contains computer-executable instructions which are executable by the processor 903. In addition, the PCFe 710 may include URSP logic 913 in the program memory which is in communication with the processing subsystem to support prioritized application processing as dictated by the UEe 715 (as well as 5G stack 915 to implement other 5G NR related functions of the PCFe). In one example, the URSPe and 5G stack logic maybe implemented on a storage device and executed on the processor 911.

The processing apparatus 903 is configured to execute at least one computer program stored in memory 911 (e.g., the logic of the URSPe rules according to the methods of FIGS. 4-6B, herein, in the form of software or firmware that implements the various functions). Other embodiments may implement such functionality within dedicated hardware, logic, and/or specialized co-processors Snot shown).

In some embodiments, the logic 913 and 915 also utilize memory 911 or other storage 909 configured to temporarily hold a number of data relating to the various rules, policies, applications or other data utilized by the UEe 715 (whether alone or in conjunction with the mass storage device 909) which it services under the 5G NR standard(s). In other embodiments, application program interfaces (APIs) such as those included in an MSO-provided application or those natively available on the PCFe may also reside in the internal cache or other memory 911. Such APIs may include common network protocols or programming languages configured to enable communication with the PCFe 710 and other network entities (e.g., via API "calls" to the PCFe by MSO network processes tasked with gathering load, configuration, subscriber, or other data).

SMFe Apparatus—

Figure 10:
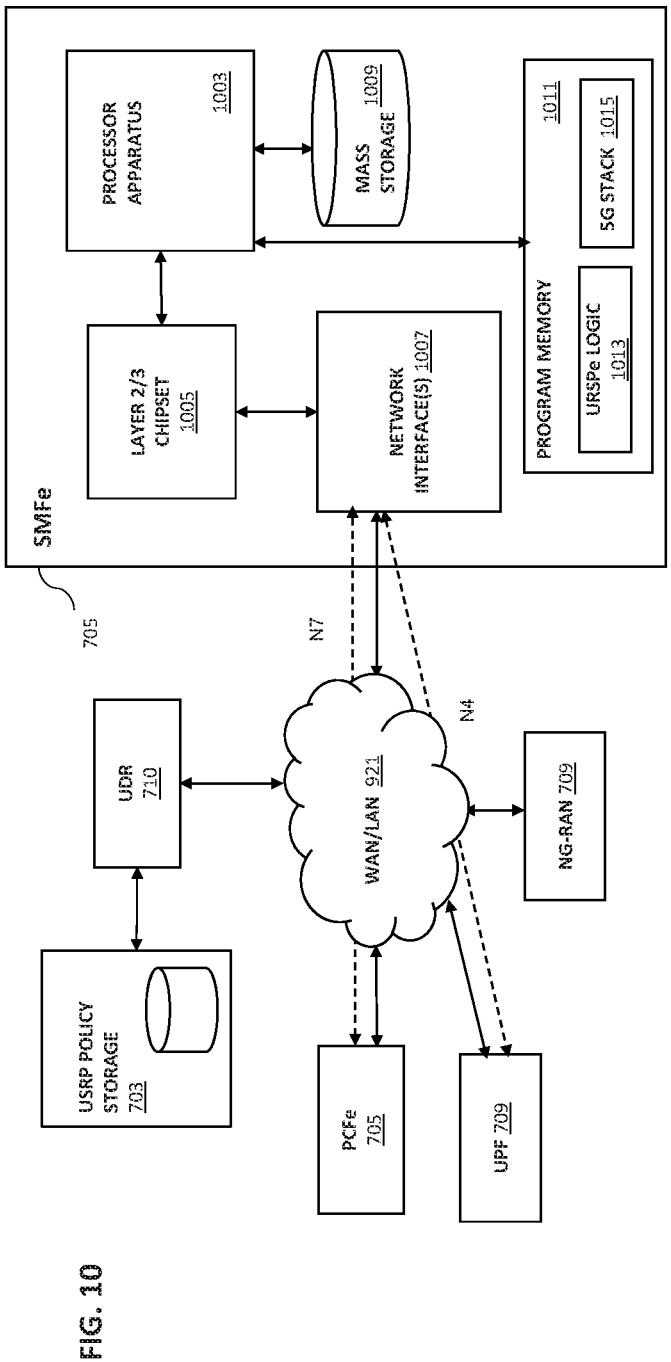
FIG. 10 is a functional block diagram illustrating an exemplary embodiment of an enhanced SMF (SMFe) apparatus useful with various embodiments of the present disclosure.

FIG. 10 illustrates an exemplary embodiment of a 5G enabled SMF (SMFe) apparatus 705, useful for operation in accordance with the present disclosure.

In one exemplary embodiment as shown, the SMFe 705 includes, inter alia, a processor apparatus or subsystem 1003, a program memory module 1011, mass storage device 1009, and network interfaces 1007 for communications with the relevant 5G-RAN or other entities such as the PCF/PCFe 710 previously described herein, the NG-RAN 709, and the UDR 710.

In the exemplary embodiment, the processor 1003 may include one or more of a digital signal processor, microprocessor, field-programmable gate array, or plurality of processing components mounted on one or more substrates. The processor 1003 may also comprise an internal cache memory, and is in communication with a memory subsystem 1011, which can comprise, e.g., SRAM, flash and/or SDRAM components. The memory subsystem may implement one or more of DMA type hardware, so as to facilitate data accesses as is well known in the art. The memory subsystem of the exemplary embodiment contains computer-executable instructions which are executable by the processor 1003. In addition, the SMFe 705 may include URSPe logic 1013 in the program memory which is in communication with the processing subsystem to support managed or prioritized application processing instructed by the UEe 715 via its USRP rules generated from the AFe 713 (as well as 5G stack 1015 to implement other 5G NR related function of SMFe). For instance, the SMFe USPRe logic 1013 may map user rules regarding individual applications and DNN values to particular paging causes as described elsewhere herein.

The processing apparatus 1003 is configured to execute at least one computer program stored in memory 1011 (e.g., the logic of the URSPe rules according to the methods of FIGS. 4-6B, herein, in the form of software or firmware that implements the various functions). Other embodiments may implement such functionality within dedicated hardware, logic, and/or specialized co-processors not shown).

In some embodiments, the logic 1013 and 1015 also utilizes memory 1011 or other storage 1009 configured to temporarily hold a number of data relating to the various USPRe rules, policies, applications, IP addresses, DNN values, or other data utilized for a given UEe 715 which it services under the 5G NR standard(s). In other embodiments, application program interfaces (APIs) such as those natively available on the SMFe may also reside in the internal cache or other memory 911. Such APIs may include common network protocols or programming languages configured to enable communication with the $PCF_e$ 710, UPF 709 and other network entities (e.g., via API "calls" to the SMFe by MSO network processes tasked with gathering load, configuration, subscriber, DNN, IP address, or other data, or vice versa).

AFe Apparatus—

Figure 11:
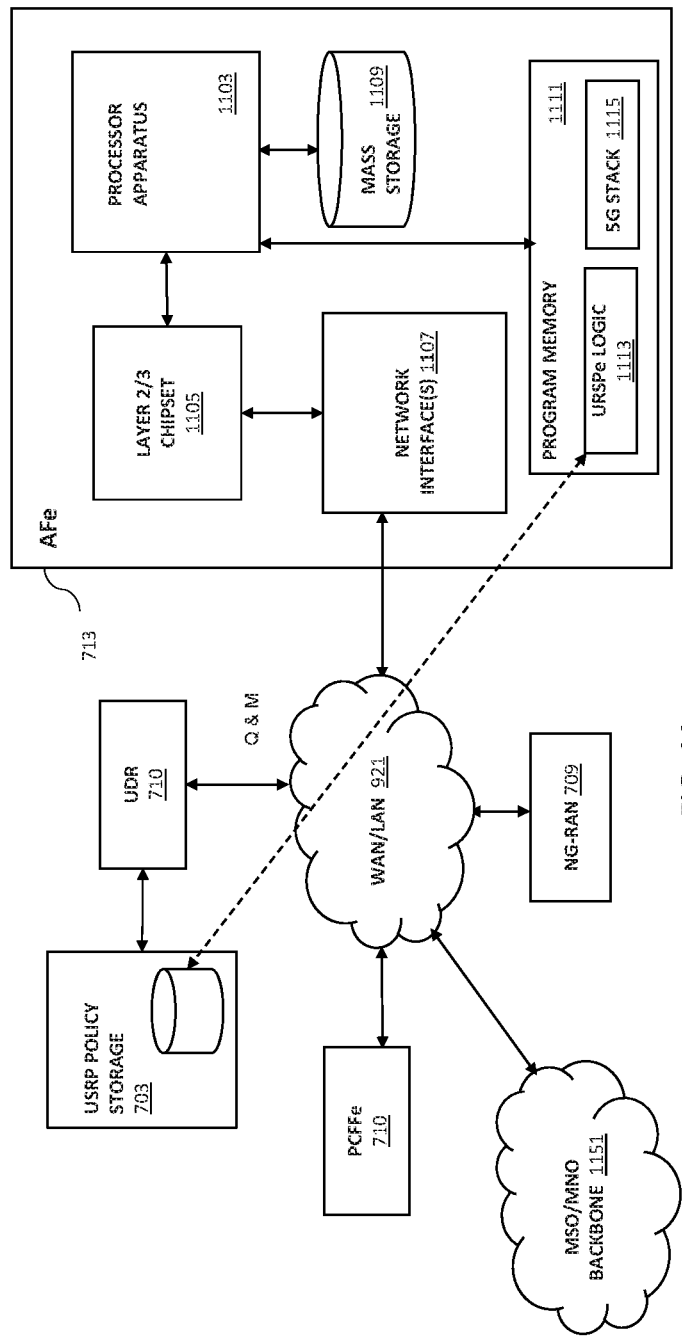
FIG. 11 is a functional block diagram illustrating an exemplary embodiment of an enhanced AF (AFe) apparatus useful with various embodiments of the present disclosure.

FIG. 11 illustrates an exemplary embodiment of a 5G enhanced AF (AFe) apparatus 713, useful for operation in accordance with the present disclosure.

In one exemplary embodiment as shown, the AFe 705 includes, inter alia, a processor apparatus or subsystem 1103, a program memory module 1111, mass storage device 1109, and network interfaces 1107 for communications with the relevant 5G-RAN or other entities such as PCF/PCFe 710 previously described herein, the NG-RAN 709, and the UDR 710, as well as an MSO or MNO data backbone, such as to enable access to the AFe 713 by a user via the Internet (e.g., a web portal or similar function). It will be appreciated that in various embodiments of the disclosure, the UEe/user may access the AFe to provide input or feedback on its desired management/prioritization functionality (e.g., application assignment to DNN groups) via (i) an app executing on the UEe and configured to contact the AFe via the NG-RAN 709 and interposed components, (ii) via a user's access of an MSO or MNO website (whether by the UEe or another user device such as a PC), or (iii) yet other approaches, such as via a third-party network-based proxy process such as e.g., an Amazon Alexa cloud-based skills platform (e.g., "Alexa . . . change my Skype Application Notification Profile to "Travel Profile" . . . "), which is communicative with the AFe 713 and which utilizes APIs to e.g., obtain data on desired user-specific profiles.

In the exemplary embodiment, the AFe processor 1103 may include one or more of a digital signal processor, microprocessor, field-programmable gate array, or plurality of processing components mounted on one or more substrates. The processor 1103 may also comprise an internal cache memory, and is in communication with a memory subsystem 1111, which can comprise, e.g., SRAM, flash and/or SDRAM components. The memory subsystem may implement one or more of DMA type hardware, so as to facilitate data accesses as is well known in the art. The memory subsystem of the exemplary embodiment contains computer-executable instructions which are executable by the processor 1103. In addition, the AFe 713 may include URSPe logic 1113 in the program memory which is in communication with the processing subsystem to support prioritized application processing rules as instructed by the UEe 715, as well as a 5G stack 1115 to implement other 5G NR related functions of the AFe including communication protocols with other 5G entities.

The processing apparatus 1103 is configured to execute at least one computer program stored in memory 1111 (e.g., the logic of the URSPe rules according to the methods of FIGS. 4-6, herein, in the form of software or firmware that implements the various functions). Other embodiments may implement such functionality within dedicated hardware, logic, and/or specialized co-processors not shown.

UEe Apparatus—

Figure 12:
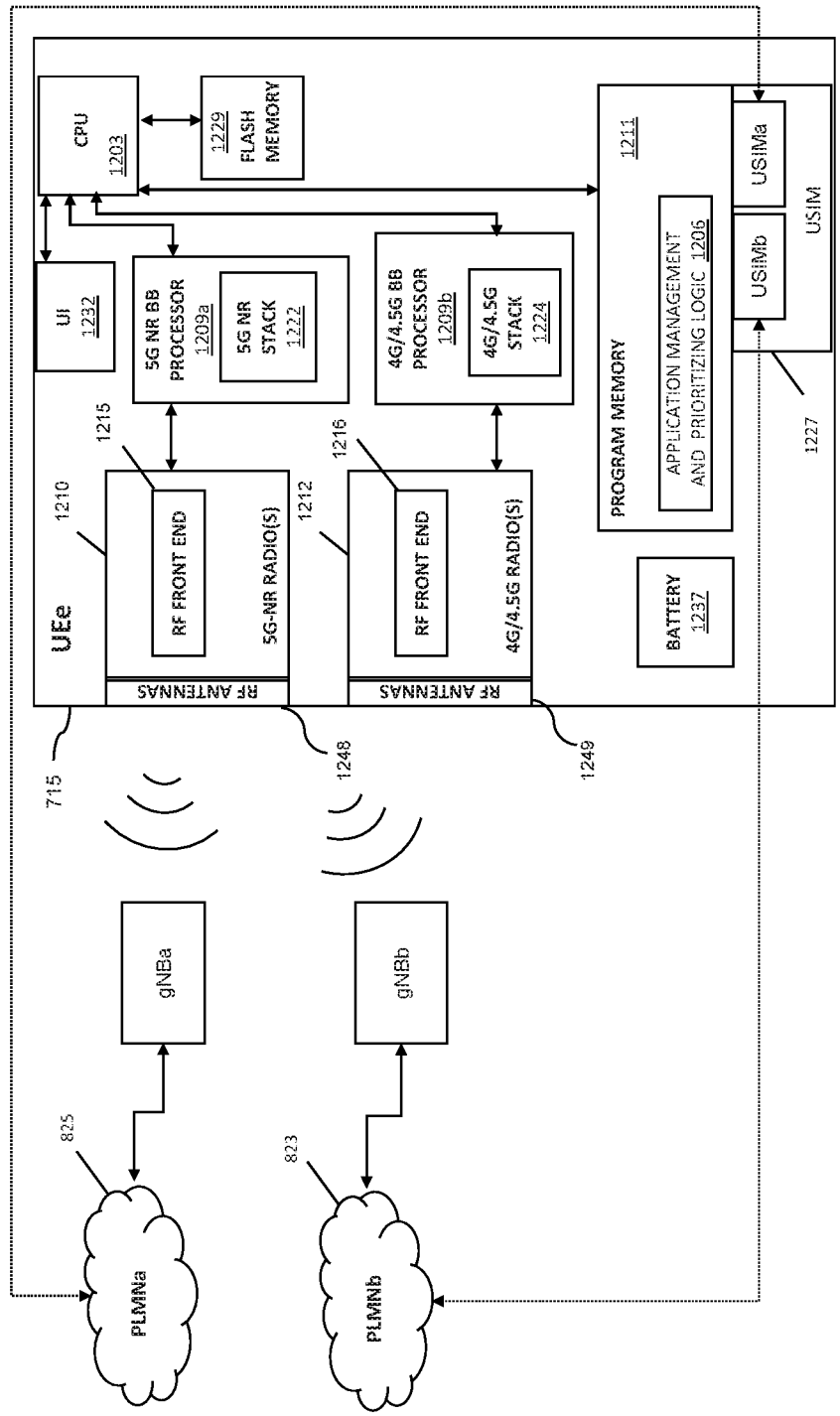
FIG. 12 is a functional block diagram illustrating an exemplary embodiment of an enhanced 3GPP-compliant multi-USIM apparatus (UEe) useful with various embodiments of the present disclosure.

FIG. 12 illustrates a block diagram of an exemplary embodiment of a UEe 715, useful for operation in accordance with the present disclosure.

In one exemplary embodiment as shown, the UEe 715 includes, inter alia, a processor apparatus or subsystem such as a CPU 1203, flash memory or other mass storage 1229, a program memory module 1211, 4G baseband processor module 1209b with 4G/4.5G stack 1224, 5G baseband processor module 1209a with 5G NR stack 1222, and 5G wireless radio interface 1210 and 4G/4.5G radio interface 1212 for communications with the relevant RANs (e.g., 5G-NR RAN and 4G/4.5G RAN) respectively, and ultimately components of the EPC or NG Core 1235 or the AFe 713 as applicable. The RF interfaces 1210, 1212 are configured to comply with the relevant PHY standards which each supports, and include an RF front end 1210, 1216 and antenna(s) elements 1248, 1249 tuned to the desired frequencies of operation (e.g., 5 GHz or 52.6-71 GHz for the 5G array, and e.g., 5 GHz for the LTE/LTE-A bands). Each of the UEe radios include multiple spatially diverse individual elements in e.g., a MIMO- or MISO-type configuration, such that spatial diversity of the received signals can be utilized. For example, an exemplary Qualcomm QTM052 mmWave antenna module may be used within the UEe device for mmWave reception and transmission. Beamforming and "massive MIMO" may also be utilized within the logic of the UE device.

In one embodiment, the various processor apparatus 1203, 1209a, 1209b may include one or more of a digital signal processor, microprocessor, field-programmable gate array, GPU, or plurality of processing components mounted on one or more substrates. For instance, an exemplary Qualcomm Snapdragon x50 5G modem may be used consistent with the disclosure as the basis for the 5G BB processor 1209a.

The various BB processor apparatus 1209a, 1209b may also comprise an internal cache memory, and a modem.

The program memory module 1211 may implement one or more of direct memory access (DMA) type hardware, so as to facilitate data accesses as is well known in the art. The memory module of the exemplary embodiment contains one or more computer-executable instructions that are executable by the CPU processor apparatus 1203.

Other embodiments may implement the application management and notification processing module/logic 1206 functionality within dedicated hardware, logic, and/or specialized co-processors (not shown). In another embodiment, the module logic 1206 is integrated with the CPU processor 1203 (e.g., via on-device local memory, or via execution on the processor of externally stored code or firmware).

In some embodiments, the UEe 715 also utilizes memory 1211 or other storage configured to temporarily hold a number of data relating to e.g., the various application configurations for various modes. For instance, when presented with a paging cause by the network, the UEe may recall data relating to particular processing rules associated with that paging cause (e.g., based on association with the paging cause to a particular DNNx value). Rules for different networks, user contexts (e.g., "traveling," "at home," "at office," "do not disturb" and the like) may also be stored within the UEe.

Also included in the UEe 715 is a USIM apparatus 1227, which is configured to securely store (and provide ancillary processing related to), which enables the UEe to register within the two separate networks (e.g., the HPLMN and VPLMN, respectively in FIG. 8). In one embodiment, the 4G/5G GUTIs are received by the UEe pursuant to registration/attach procedures, and stored within the USIM 1227 in respective storage elements thereof (e.g., SE's or cryptographically secure elements).

In some embodiments, the UEe logic also utilizes memory 1211 or other storage 1229 configured to temporarily hold a number of data relating to various PLMN associations for the various services/applications such as voice, etc.) for the various functions described herein.

In other embodiments, application program interfaces (APIs) such as those included in an MSO-provided application or those natively available on the UEe may also reside in the internal cache or other memory 1211. Such APIs may include common network protocols or programming languages configured to enable communication with the UEe and other network entities (e.g., via API "calls" to the UEe by MSO network processes tasked with gathering paging, application load, configuration, usage of PLMNs, or other data). As an aside, a downloadable application or "app" may be available to subscribers of an MSO or cable network (and/or the general public, including MSO "partner" MNO subscribers), where the app allows users to configure their UEe via the UI 1232 to implement enhanced functionality, including interface with the AFe 713, data collection and reporting back to the AFe/MSO core network, and other functions so as to enable, inter alia, service/RAN availability when roaming, congestion, or other attributes which may be useful in implementing e.g., the methodologies of FIGS. 4-6B discussed above. Application program interfaces (APIs) may be included in MSO-provided applications, installed with other proprietary software that comes pre-packaged with the UEe. Alternatively, the relevant MNO may provide its subscribers with the aforementioned functionality (e.g., as a pre-loaded app on the UEe at distribution, or later via download), or as a firmware update to the UEe stack conducted OTA.

Other applications making use of e.g., IP data sessions, such as instant messaging or other social media (e.g., Skype, WhatsApp, etc.), VPN apps, VoIP apps, banking apps, and similar may also be installed and operative on the UEe 715.

Service Provider Networks

Figure 13:
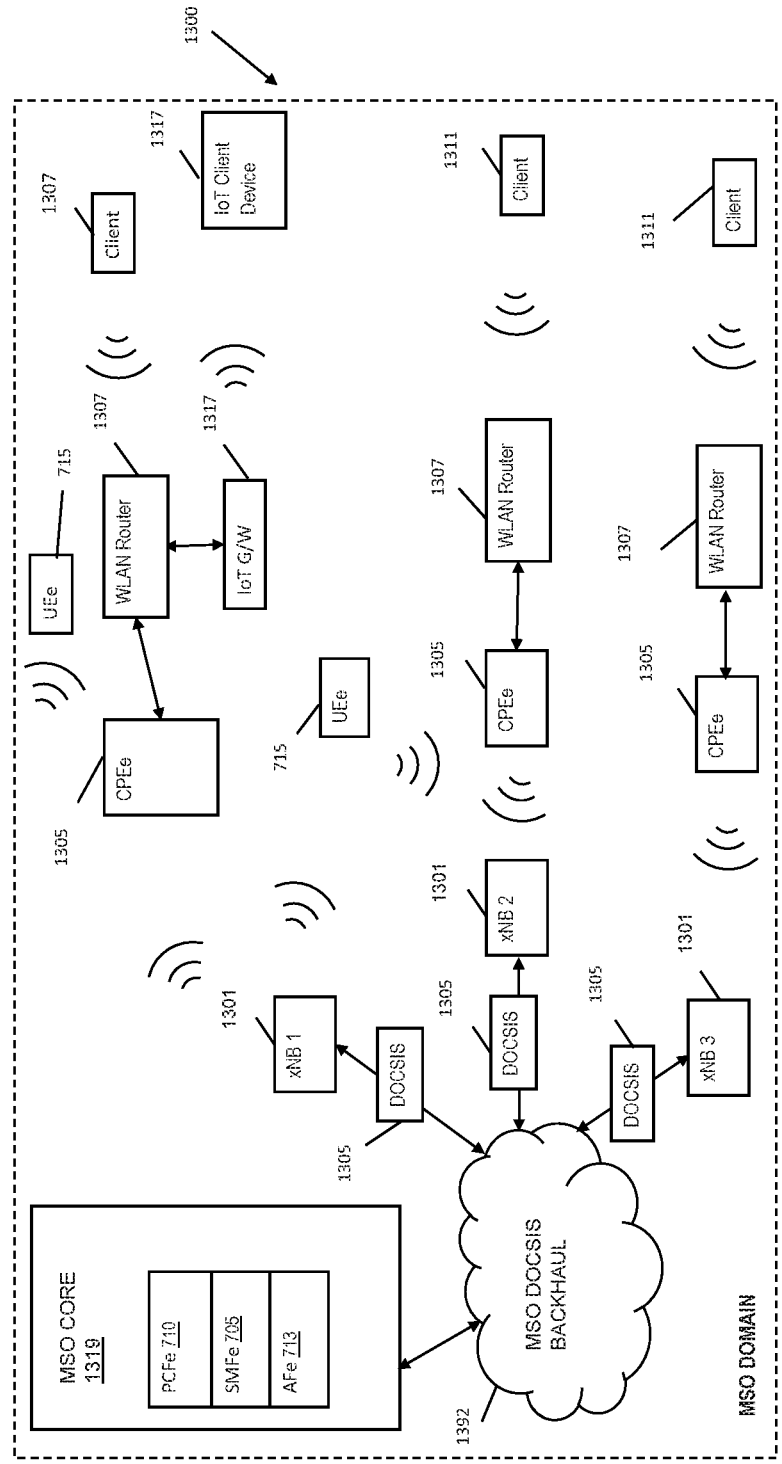
FIG. 13 is a functional block diagram of a first exemplary MSO network architecture useful in conjunction with various principles described herein.

FIG. 13 illustrates a typical service provider network configuration useful with the features of the apparatus and methods described herein. It will be appreciated that while described with respect to such network configuration, the methods and apparatus described herein may readily be used with other network types and topologies, whether wired (e.g., copper or optical) or wireless, managed or unmanaged.

The exemplary service provider network 1300 is used in the embodiment of FIG. 13 to provide backhaul and Internet access from the service provider's wireless access nodes (e.g., eNB, gNB or Node B NR-U) devices, Wi-Fi APs, and FWA devices operated or maintained by the MSO), and one or more stand-alone or embedded DOCSIS cable modems (CMs) 1305 in data communication therewith. It will be appreciated that the xNB and UEe devices described herein may operate on licensed, unlicensed, or quasi-licensed/ shared access spectrum while utilizing the underlying 3GPP 4G/5G NR/NR-U based protocols described herein.

The individual xNB's 1301 are backhauled by the CMs 1305 to the MSO core via e.g., CMTS or CCAP MHAv2/ RPD or other such architecture, and the MSO core 1319 includes at least some of the EPC/5GC core functions previously described, as well as PCFe/SMFe/AFe network processes 710,705,713 as shown. The enhanced network processes are in one embodiment realized as one or more network-based servers which communicates with the MSO infrastructure so as to effect various functions, including those of FIGS. 4-6 as previously described.

Client devices 1311 such as tablets, smartphones, Smart-TVs, etc. at each premises are served by respective WLAN routers 1307, IoT gateways 1317, and NR-U or CBRS capable CPEe/FWAe 1305, the latter which are backhauled to the MSO core or backbone via their respective xNB's, and which themselves may be enhanced with paging notification management capability to act in effect as fixed UEe. While such devices may not be mobile as in the exemplary UEe 715 previously described, they may reside within the operational areas of two PLMNs (e.g., an MSO PLMN or small-cell PLMN served by e.g., CBRS or NR-U-enabled 3GPP CBSDs or gNBs, and an MNO macrocell network), and as such may selectively operate within both networks in the event that the fixed UEe includes DSDS/dual-USIM capability. As such, the present disclosure contemplates servicing of any number of different configurations of UEe including both mobile and fixed devices, and a number of possible RAN and PLMN configurations (including femto-cell and small-cell "micro" PLMNs maintained by multiple different subscribers or enterprises, including those operating within or adjacent to coverage areas of MSO or MNO macrocells.

Notably, in the embodiment of FIG. 13, all of the necessary components for support of the wireless service provision and backhaul functionality are owned, maintained and/or operated by the common entity (e.g., cable MSO). The approach of FIG. 13 has the advantage of, inter alia, giving the MSO complete control over the entire service provider chain so as to optimize service to its specific customers (versus the non-MSO customer-specific service provided by an MNO), and the ability to construct its architecture to optimize incipient 5G NR functions such as network slicing, gNB DU/CU Option "splits" within the infrastructure, selection or configuration of subsets or groups of gNB (or their individual DU), etc. Also, the presence of the AFe 713 within the MSO domain allows the MSO to control subscriber access and the interface experience thereof; e.g., via an MSO-provided app for the UEe 715, a website or other portal functionality "branded" for the MSO and configured for its desired functions, and control over IP address assignment for individual application/DNN values (e.g., the MSO may maintain a semi-static or static pool of IP addresses for use by particular UEe, classes of subscriber, etc.).

Figure 14:
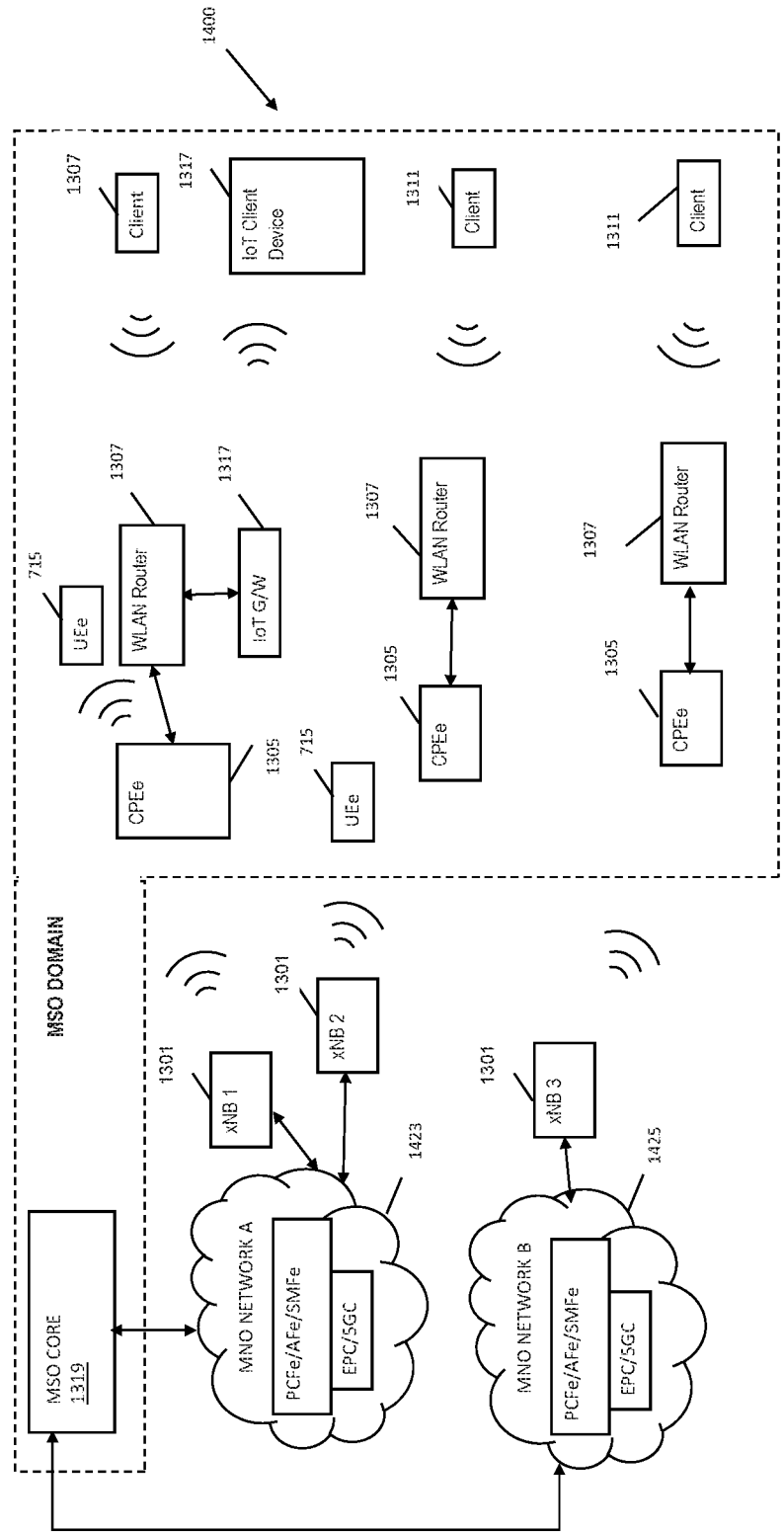
FIG. 14 is a functional block diagram of an exemplary MNO network architecture useful in conjunction with various principles described herein, wherein respective portions of the infrastructure are managed or operated by the MSO and one or more MNOs.

FIG. 14 illustrates another embodiment of the network architecture, highlighting one possible relationship between an MSO architecture and an MNO architecture. As shown, the MSO service domain extends only to the CPEe/FWAe and served premises and the MSO core functions, while other functions such as 3GPP EPC/E-UTRAN or 5GC and NG-RAN functionality, as well as PCFe/SMFe/AFe functions, are provided by one or more MNO networks 1423, 1425 operated by MNOs (which may belong to the same or different operators), including in some embodiments those with which the MSO has a service agreement. In this approach, at least some of the PCFe/SNIFe/AFe are maintained and operated by the MNO, although this is not a requirement, and the present disclosure contemplates embodiments where portions of the paging cause mapping and notification functionality is maintained by the MSO or even a third party. The approach of FIG. 14 (i.e., coordination of MSO and MNO networks) has the advantage of, inter alia, avoiding more CAPEX by the MSO, including duplication of infrastructure which may already service the area of interest, including reduced RF interference due to addition of extra (and ostensibly unnecessary) RAN components such as xNB's or other transceivers.

Hence, depending on what data is useful to the MSO or its customers, various portions of the foregoing can be associated and stored to particular xNB "clients" or their components being backhauled by the MSO network, whether owned by the MSO, MNO, or another entity. These data can also be utilized by e.g., a controller or another network process in IP data session and paging management processes for MUSIM UEe's within the infrastructure, such as based on operational loading of a given xNB or the network as a whole, UEe location relative to the xNB's, subscriber account or subscription level or privileges, presence of other suitable backhauls for the UEe such as WLAN, 5G NR network slicing considerations, and/or yet other factors which will be recognized by those of ordinary skill in the wireless infrastructure arts given the present disclosure. As such, operational load on the network may also be reduced via implementation of differentiated paging by the network, since unnecessary or undesired PDN sessions requested by the UEe 517 may be reduced or obviated based on that UEe's particular USRP(e) rules and desired paging behavior.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. Computerized network apparatus for use within a wireless network infrastructure, comprising:
   digital processing apparatus;
   at least one data network interface in data communication with the digital processing apparatus; and
   a storage device in data communication with the digital processing apparatus, the storage device comprising a storage medium having at least one computer program, the at least one computer program configured to, when executed on the digital processing apparatus, cause the computerized network apparatus to:
      receive first data relating to one or more processing rules for respective one or more software applications operative to execute on a computerized user device;
      based at least on the received first data, determine at least one route selection policy associated with data traffic of the one or more software applications; and
      cause forwarding of second data relating to the at least one route selection policy to the computerized user device;
      wherein the forwarding of the second data relating to the at least one route selection policy enables the computerized user device to selectively implement the one or more processing rules for paging notifications sent to the computerized user device when the computerized user device is connected to the wireless network infrastructure.

2. The computerized network apparatus of claim 1, wherein the second data comprises data indicative of one or more paging causes.

3. The computerized network apparatus of claim 1, wherein the at least one computer program is further configured to, when executed on the digital processing apparatus, cause the computerized network apparatus to: enable selective routing of Internet Protocol (IP) packets to the computerized user device, the IP packets associated with one of the one or more software applications, the IP packets comprising a destination address associated with a particular one of the one or more software applications.

4. The computerized network apparatus of claim 1, wherein the wireless network infrastructure is compliant with 3GPP (3rd Generation Partnership Project) 5G NR (Fifth Generation New Radio) protocols, and the second data comprises a URSP (UE Route Selection Policy).

5. The computerized network apparatus of claim 4, wherein the URSP (UE Route Selection Policy) comprises at least one Data Network Name (DNN) value.

6. The computerized network apparatus of claim 1, wherein the computerized network apparatus comprises at least: (i) a 5G NR (Fifth Generation New Radio) Session Management Function (SMF), and (ii) a 5G NR User Plane Function (UPF).

7. The computerized network apparatus of claim 6, wherein the computerized network apparatus further comprises a Policy Control Function (PCF).

8. A computerized method of performing paging notification management within a wireless network, comprising:
   receiving data indicative of user preferences for notifications relating to each of a plurality of applications operative to execute on a wireless computerized client device of a user;
   causing generation of one or more rules based on the received data;

receiving a plurality of IP (Internet Protocol) data packets at the wireless network, the plurality of IP data packets generated by respective ones of data sources associated with each of the plurality of applications;

processing the received plurality of IP data packets to map the plurality of IP data packets to a plurality of paging causes; and causing transmission of at least one paging notification for each of the plurality of applications to the wireless computerized client device, each of the at least one paging notifications comprising one of the plurality of paging causes; and wherein the computerized method enables the wireless computerized client device to selectively disposition each of the at least one paging notifications according to the user preferences.

9. The computerized method of claim 8, further comprising assigning a plurality of unique IP addresses to each of the plurality of applications, each of the plurality of IP data packets comprising an applicable one of the plurality of unique IP addresses.

10. The computerized method of claim 9, wherein:
the receiving of the data indicative of the user preferences for the notifications relating to each of the plurality of applications operative to execute on the wireless computerized client device of the user comprises receiving data indicative of at least two groups, each of the groups comprising at least one of the plurality of applications; and the computerized method further comprises correlating each of the plurality of unique IP addresses to at least the one of the plurality of paging causes.

11. A computerized mobile device configured for use within multiple mobile network environments, the computerized mobile device comprising:
digital processor apparatus;
wireless interface apparatus in data communication with the digital processor apparatus and configured for wireless communication with at least a first radio area network (RAN) utilizing a first wireless access technology; and
storage apparatus in data communication with the digital processor apparatus and comprising a storage medium, the storage medium comprising at least one computer program, the at least one computer program, configured to, when executed on the digital processor apparatus:
receive policy data relating to data traffic management of a plurality of user applications operative to execute on the computerized mobile device;
receive a plurality of paging notifications from a first of the multiple mobile network environments, the plurality of paging notifications each comprising a paging cause which is differentiated relative to others of the plurality of paging notifications; and
based at least on the received policy data and the paging causes, selectively disposition each of the plurality of paging notifications.

12. The computerized mobile device of claim 11, wherein the selective disposition of each of the plurality of paging notifications comprises:
termination of a connection with the first of the first multiple mobile network environments;
establishment of a connection with a second of the multiple mobile network environments; and
a request of a PDU (packet data unit) session be established via the second of the multiple mobile network environments for receiving IP (Internet Protocol) data traffic associated with one of the plurality of user applications.

13. The computerized mobile device of claim 12, further comprising:
first subscriber identity apparatus configured to enable connection of the computerized mobile device to the first of the multiple mobile network environments; and
second subscriber identity apparatus configured to enable connection of the computerized mobile device to the second of the multiple mobile network environments; and
wherein the computerized mobile device comprises a DSDS (dual-SIM, dual standby) device which is only capable of one network connection at a given time.

14. The computerized mobile device of claim 11, wherein the paging causes relate to at least one route selection policy and enable the computerized mobile device to selectively implement one or more processing rules for each of the plurality of paging notifications when the computerized user device is connected to the first of the multiple mobile network environments.

15. The computerized mobile device of claim 14, wherein the first of the multiple mobile network environments is compliant with 3GPP (3rd Generation Partnership Project) 5G NR (Fifth Generation New Radio) protocols, and the at least one route selection policy comprises a URSP (UE Route Selection Policy).

16. The computerized mobile device of claim 15, wherein the URSP comprises at least one Data Network Name (DNN) value.

17. The computerized mobile device of claim 11, wherein the at least one computer program, is further configured to, when executed on the digital processor apparatus:
receive Internet Protocol (IP) packets, wherein the IP packets (i) are associated with one or more software applications, and (ii) comprise a destination address associated with the one or more software applications.

18. The computerized mobile device of claim 11, wherein the receipt of the policy data comprises receipt from a computerized network apparatus, the computerized network apparatus comprising at least: (i) a 5G NR (Fifth Generation New Radio) Session Management Function (SMF), (ii) a 5G NR User Plane Function (UPF), and (iii) a Policy Control Function (PCF).

19. The computerized mobile device of claim 11, wherein the at least one computer program, is further configured to, when executed on the digital processor apparatus:
receive data indicative of user preferences for notifications relating to each of a plurality of applications operative to execute on the computerized mobile device; and
receive a plurality of IP (Internet Protocol) data packets, the plurality of IP data packets generated by respective ones of data sources associated with each of the plurality of applications;
wherein a plurality of unique IP addresses are assigned to each of the plurality of applications, and each of the plurality of IP data packets comprise an applicable one of the plurality of unique IP addresses.

20. The computerized mobile device of claim 19, wherein:
the receipt of of the data indicative of the user preferences comprises receipt of data indicative of at least two groups, each of the groups comprising at least one of the plurality of applications; and each of the plurality of unique IP addresses are correlated to at least the one of the paging causes.

\* \* \* \* \*